(12) United States Patent
Xu et al.

(10) Patent No.: US 11,249,721 B2
(45) Date of Patent: Feb. 15, 2022

(54) MULTIPLICATION CIRCUIT, SYSTEM ON CHIP, AND ELECTRONIC DEVICE

(71) Applicant: Huawei Technologies Co., Ltd., Shenzhen (CN)

(72) Inventors: Bin Xu, Hangzhou (CN); Kaixing Wang, Hangzhou (CN); Qinglin Tian, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 154 days.

(21) Appl. No.: 16/822,720

(22) Filed: Mar. 18, 2020

(65) Prior Publication Data

US 2020/0218509 A1 Jul. 9, 2020

Related U.S. Application Data

(63) Continuation of application No. PCT/CN2018/106559, filed on Sep. 19, 2018.

(30) Foreign Application Priority Data

Sep. 19, 2017 (CN) .......................... 201710852544.4

(51) Int. Cl.
*G06F 7/48* (2006.01)
*G06F 7/487* (2006.01)
*G06F 7/523* (2006.01)

(52) U.S. Cl.
CPC ............ *G06F 7/4812* (2013.01); *G06F 7/487* (2013.01); *G06F 7/523* (2013.01)

(58) Field of Classification Search
CPC ...... G06F 7/4812; G06F 7/4876; G06F 7/483; G06F 7/4833; G06F 7/523

(Continued)

(56) References Cited

U.S. PATENT DOCUMENTS 4,626,825 A 12/1986 Burleson et al.
6,003,058 A 12/1999 Kirschenbaum et al.
(Continued)

FOREIGN PATENT DOCUMENTS

CN 1178588 A 4/1998
CN 101133389 A 2/2008
(Continued)

OTHER PUBLICATIONS

T. Brubaker et al., Multiplication Using Logarithms Implemented with Read-Only Memory, IEEE Transactions on Computers, Vo. C-24, No. 8, 1975 (Year: 1975).*

(Continued)

*Primary Examiner* — Jaweed A Abbaszadeh
*Assistant Examiner* — Emily E Larocque
(74) *Attorney, Agent, or Firm* — Conley Rose, P.C.

(57) ABSTRACT

A multiplication circuit includes an addition subcircuit configured to obtain logarithmic field data a and b that correspond to A and B, and perform an addition operation on a and b to obtain c, where c includes an integral part and a fractional part, an exponentiation operation subcircuit configured to perform an exponentiation operation in which a base is 2 and an exponent is the fractional part of c, to obtain an exponentiation operation result, a shift subcircuit configured to shift the exponentiation operation result based on the integral part of c to obtain a shift result, and an output subcircuit configured to output a product of A and B based on signs of a and b and with reference to the shift result.

20 Claims, 11 Drawing Sheets

(58) Field of Classification Search
USPC .......................................................... 708/512
See application file for complete search history.

(56) References Cited

U.S. PATENT DOCUMENTS

| | | | |
|---|---|---|---|
| 6,466,633 B1 | 10/2002 | Laufer | |
| 2006/0101244 A1 | 5/2006 | Siu et al. | |
| 2006/0106905 A1* | 5/2006 | Chren | .................... G06F 1/0307 |
| | | | 708/270 |
| 2010/0030833 A1* | 2/2010 | Mogi | ....................... G06F 7/483 |
| | | | 708/512 |
| 2014/0028677 A1* | 1/2014 | Sheikh | .................... G06T 15/50 |
| | | | 345/426 |
| 2014/0188963 A1 | 7/2014 | Tsen et al. | |

FOREIGN PATENT DOCUMENTS

| | | |
|---|---|---|
| CN | 103369326 A | 10/2013 |
| CN | 103455302 A | 12/2013 |
| CN | 102436365 B | 4/2014 |
| CN | 104011706 A | 8/2014 |

OTHER PUBLICATIONS

P. Saha et al., High speed multiplier using high accuracy floating point logarithmic number system, Scientia Iranica D, 21(3), 826-841, 2014 (Year: 2014).*

Fu, H., et al., "FPGA Designs with Optimized Logarithmic Arithmetic," IEEE Transactions on Computers, IEEE, USA, vol. 59, No. 7, Jul. 1, 2010, pp. 1000-1006, XP011303207.

Lee, P., "An FPGA Prototype for a Multiplierless FIR Filter Built Using the Logarithmic Number System," XP019196438, pp. 303-310.

Kapgate, P., et al., "Design and Implementation of Complex Arithmetic Operations using Binary Logarithmic Number System," 2015 International Conference on Communications and Signal Processing (ICCSP), IEEE, Apr. 2, 2015, pp. 1374-1377, XP032807607.

Koren, I., "Logarithmic Number Systems—Computer Arithmetic Algorithms, Chapter 10," In: "Computer Arithmetic Algorithms", Jan. 1, 2001, pp. 247-257, XP055575245.

* cited by examiner

MULTIPLICATION CIRCUIT, SYSTEM ON CHIP, AND ELECTRONIC DEVICE

CROSS-REFERENCE TO RELATED APPLICATIONS

This application is a continuation of International Patent Application No. PCT/CN2018/106559 filed on Sep. 19, 2018, which claims priority to Chinese Patent Application No. 201710852544.4 filed on Sep. 19, 2017, both of which are hereby incorporated by reference in their entireties.

TECHNICAL FIELD

This application relates to the data processing field, and more specifically, to a multiplication circuit, a system-on-a-chip, and an electronic device.

BACKGROUND

In the current information age, internet and internet of things applications generate a large amount of data every day, and valuable information can be usually obtained by mining and processing the data. With popularization of a self-driving vehicle, an unmanned aerial vehicle, and an intelligent terminal, artificial intelligence is widely valued. The artificial intelligence uses a neural network technology to perform real-time processing on data input by various sensors in order to implement perception of an external environment. In these data processing algorithms, a matrix operation is a core computing mode, for example, a matrix multiplication, and the matrix multiplication is based on a multiply-accumulate operation. A typical visual geometry group-16 (VGG16) neural network is used to process a picture with a size of 224×224, and a calculated amount is 29 billion times of multiply-accumulate operations. This poses a severe challenge to current computing hardware and a current computing mode. In the multiply-accumulate operation, costs of multiplication are maximum. This restricts a speed of the matrix operation, and also affects power consumption of a device.

SUMMARY

This application provides a multiplication circuit, a system-on-a-chip, and an electronic device such that overheads during data conversion between a linear field and a logarithmic field can be reduced, and a speed of various multiplication-based operations can be improved.

According to a first aspect, this application provides a multiplication circuit configured to perform a multiplication operation on two pieces of data A and B. The multiplication circuit includes an addition subcircuit configured to obtain logarithmic field data a and logarithmic field data b that are respectively corresponding to A and B, and perform an addition operation on a and b to obtain c, where c includes an integral part and a fractional part, an exponentiation operation subcircuit configured to perform an exponentiation operation in which a base is 2 and an exponent is the fractional part of c, to obtain an exponentiation operation result, a shift subcircuit configured to shift the exponentiation operation result based on the integral part of c to obtain a shift result, and an output subcircuit configured to output a product of A and B based on signs of a and b and with reference to the shift result.

In a possible implementation of the first aspect, the logarithmic field data a and the logarithmic field data b are obtained by respectively calculating logarithms to base 2 of absolute values of A and B and with reference to sign bits of the logarithmic field data a and the logarithmic field data b, and include 1+m+n binary bits, where m and n are positive integers, a first bit is a sign bit, m bits are the integral part, and n bits are the fractional part.

In a possible implementation of the first aspect, the integral part of c is a sum of an integral part of a and an integral part of b, and the fractional part of c is a sum of a fractional part of a and a fractional part of b.

In a possible implementation of the first aspect, logarithmic field data corresponding to a value 0 is defined as follows a value of a sign bit is 1, and both an integral part and a fractional part are 0.

In a possible implementation of the first aspect, both A and B include 1+j+k binary bits, both j and k are positive integers, a first bit is a sign bit, j bits are an integral part, and k bits are a fractional part.

In a possible implementation of the first aspect, the exponentiation operation result is a number greater than or equal to 1 and less than 2, and the operation result includes 1+w binary bits, where a first bit is an integral part, w bits are a fractional part, and w is a positive integer greater than or equal to 1, and when the shift subcircuit is configured to shift the exponentiation operation result based on the integral part of c, the shift subcircuit is further configured to shift the exponentiation operation result to the left by X bits, where X is equal to the integral part of c minus (w−k), the shift result is an absolute value of the product of A and B, an integral part of the absolute value of the product includes j binary bits, a fractional part includes k binary bits, and when a quantity of bits for the left shift is less than 0, shifting to the left by x bits is equal to shifting to the right by bits of an absolute value of x.

In a possible implementation of the first aspect, the exponentiation operation subcircuit is a decoding circuit, and the decoding circuit is configured to obtain the exponentiation operation result through decoding based on the fractional part of c, or the exponentiation operation subcircuit is a table lookup circuit, and the table lookup circuit is configured to obtain the exponentiation operation result through table lookup based on the fractional part of c.

In a possible implementation of the first aspect, the multiplication circuit further includes an accumulator configured to perform an accumulation operation on the product of the data A and the data B and another piece of data from the multiplication circuit, or the accumulator is configured to perform an accumulation operation on the product of the data A and the data B and the product from another multiplication circuit.

The multiplication circuit in the first aspect implements multiplication using the addition subcircuit, the exponentiation operation subcircuit, the shift subcircuit, and the output subcircuit. A complex exponentiation operation circuit is not required. Compared with the multiplication circuit, implementation of these subcircuits saves more resources and occupies less logical resources, thereby reducing an area occupied by a device and power consumption.

According to a second aspect, a system-on-a-chip is provided, including a processor core, a multiplication hardware circuit array consisting of one or more multiplication hardware circuits according to any one of the first aspect or the possible implementations of the first aspect, a data input buffer, a data output buffer, and a control circuit, where the control circuit is connected to the processor core, the data input circuit, and the data output circuit, the data input circuit is configured to obtain data from the processor core using the control circuit, the multiplication hardware circuit array is configured to obtain data in the data input buffer for processing, obtain a processed result, and output the processed result to the data output buffer, and the control circuit is further configured to interact with the processor core such that the processor core obtains data in the data output buffer.

In a possible implementation of the second aspect, the system-on-a-chip further includes a logarithmic conversion circuit configured to perform logarithmic field conversion on output of the multiplication hardware circuit array, and input a converted result to the data input buffer.

In a possible implementation of the second aspect, the logarithmic field conversion circuit includes an integer computing subcircuit, a decimal computing subcircuit, and a second sign bit determining subcircuit, where the linear field array output data is a binary number consisting of 1+j+k bits, both j and k are positive integers, 1 bit is a second sign bit, and is used to indicate a positive/negative sign S, j bits are used to indicate a value J of an integral part of an absolute value of the linear field data, and k bits are used to indicate a value K of a fractional part of the absolute value of the linear field data, the integer computing subcircuit is configured to calculate a difference between hl and k based on a value hl of a quantity of bits in which a non-zero highest bit of the binary number of j+k bits of the linear field array output data is located, where the difference is used to indicate a value of an integral part of a result obtained by calculating a logarithm to base 2 of an absolute value of A1, and a lowest bit of the binary number of j+k bits of the linear field array output data A1 is denoted as a $0^{th}$ bit, the decimal computing subcircuit is configured to obtain, based on a predetermined quantity of s bits after the non-zero highest bit from a high bit to a low bit of the linear field array output data, a value of a fractional part of the result obtained by calculating the logarithm to base 2 of the absolute value of the linear field array output data, and the second sign bit determining subcircuit is configured to separately determine, based on a sign of the linear field array output data, a sign of the logarithmic field array output data in order to obtain the logarithmic field array output data.

In a possible implementation of the second aspect, the decimal computing subcircuit is further configured to obtain, through table lookup or decoding, a value N1 corresponding to s bits after the non-zero highest bit from a high bit to a low bit of A1, and obtain, through table lookup or decoding, a value N2 corresponding to s bits after the non-zero highest bit from a high bit to a low bit of A2, where the table stores a value N corresponding to all possible values of s bits.

In a possible implementation of the second aspect, the decimal computing subcircuit is further configured to compare a value corresponding to s bits after the non-zero highest bit from a high bit to a low bit of A1 with preset $2^n$ comparison values, where an $i^{th}$ comparison value is less than an $(i+1)^{th}$ comparison value, and the $i^{th}$ comparison value corresponds to one value $N_i$, when the value corresponding to s bits after the non-zero highest bit from the high bit to the low bit of A1 is greater than or equal to a T1 comparison value, and is less than a $(T1+1)^{th}$ comparison value, determine that N1 is $N_{T1}$, compare a value corresponding to s bits after the non-zero highest bit from a high bit to a low bit of A2 with the preset $2^n$ comparison values, where the $i^{th}$ comparison value is less than the $(i+1)^{th}$ comparison value, and the $i^{th}$ comparison value corresponds to one value $N_i$, and when the value corresponding to s bits after the non-zero highest bit from the high bit to the low bit of A2 is greater than or equal to a $T2^{th}$ comparison value, and is less than a $(T_2+1)^{th}$ comparison value, determine that N2 is $N_{T2}$.

In a possible implementation of the second aspect, the decimal computing subcircuit is further configured to compare a value corresponding to high x bits of s bits after the non-zero highest bit from a high bit to a low bit of A1 with preset $2^n$ intervals, where an $i^{th}$ interval corresponds to a pair of values αi and βi, x is greater than 0 and less than s, when the value corresponding to the high x bits of s bits after the non-zero highest bit from the high bit to the low bit of A1 falls into a first interval, find a pair of values α1 and β1 corresponding to the first interval, calculate a result of x×α1+β1, and obtain the N1 based on the result of x×α1+β1, compare a value corresponding to high x bits of s bits after the non-zero highest bit from a high bit to a low bit of A2 with the preset $2^n$ intervals, and when the value corresponding to the high x bits of s bits after the non-zero highest bit from the high bit to the low bit of A2 falls into a second interval, find a pair of values α2 and β2 corresponding to the second interval, calculate a result of x×α2+β2, and obtain the N2 based on the result of x×α2+β2.

According to a third aspect, this application provides a multiplication hardware circuit used for a multiplication operation. Specifically, the hardware circuit herein is a circuit implemented based on an application-specific integrated circuit (ASIC), an field-programmable gate array (FPGA), and the like, and is not implemented based on a general purpose processor (for example, a processor that is based on an x86 and advanced RISC machine (ARM) architecture and that needs to read an instruction to perform a specific operation). Certainly, in theory, the general purpose processor may also be used for implementation, but efficiency is not high. Therefore, to process data more efficiently, the hardware circuit implemented based on the ASIC and the FPGA needs to be used. The multiplication hardware circuit in the embodiments refers to a hardware circuit that can implement multiplication, and performing some other operations, such as an accumulation operation, based on the multiplication is not limited.

The multiplication hardware circuit in this application includes a logarithmic field adder and a linear field conversion circuit, and the linear field conversion circuit includes an exponentiation operation subcircuit, a shift subcircuit, and a sign bit determining subcircuit.

The logarithmic field adder is configured to perform an addition operation first logarithmic field data a1 and second logarithmic field data a2, to obtain logarithmic field data c1, where logarithmic field data is data obtained by calculating a logarithm to base 2 of an absolute value of linear field data with reference to a positive/negative sign bit of the linear field data, a1 and a2 are obtained by separately performing logarithmic field conversion on two pieces of data first data A1 and second data A2 used in the multiplication operation, a1, a2, and c1 are all binary numbers consisting of 1+m+n bits, both m and n are positive integers, 1 bit is a first sign bit, and is used to indicate a positive/negative sign (also briefly referred to as "sign" in the following, which is not distinguished in this application), m bits are used to indicate a value of an integral part, and n bits are used to indicate a value of a fractional part.

In this application, logarithmic field data is in a relative relationship with linear field data. If logarithmic field conversion is performed on one piece of data (to be specific, a logarithm to base 2 of an absolute value of the data is calculated and represented with reference to a positive/ negative sign bit of the data) to obtain another piece of data, the data before logarithmic field conversion is referred to as the linear field data, and the data after conversion is referred to as the logarithmic field data. For example, for data −8, if a logarithm to base 2 of an absolute value of −8 is calculated $\log_2|-8|=3$, and then −3 is obtained with reference to a positive/negative sign (−) of −8. In this case, −8 is referred to as linear field data, and −3 is referred to as logarithmic field data. Correspondingly, in addition to logarithmic field conversion, linear field conversion may alternatively be performed on the data in turn (to be specific, an absolute value power of the data is raised to 2, and a result is represented with reference to a sign bit of the data). For example, for −3, a |−3| power to 2 is equal to 8, and then −8 is obtained with reference to a sign bit (−).

In this application, prefixes such as "first" and "second" are only used to distinguish between different individuals that modify a same type of nouns, and do not represent another special meaning. For example, both first logarithmic field data and second logarithmic field data are used to distinguish between different individuals that modify a noun, namely, "logarithmic field data", and do not indicate that the "first logarithmic field data" is logarithmic field data in a specific format and the "second logarithmic field" is logarithmic field data in another format. In this application, when "logarithmic field data" is mentioned, an attribute of the logarithmic field data is also applicable to both the "first logarithmic field data" and the "second logarithmic field data".

The multiplication hardware circuit further includes the exponentiation operation subcircuit configured to obtain N' based on a value N1 of a fractional part of c1, where a value of N' is the N1$^{th}$ power of 2. In other words, the exponentiation operation subcircuit is configured to obtain N' by calculating $2^{N1}$. It should be noted that a calculation process in this application is usually erroneous, because when a digital circuit based on an ASIC and an FPGA is implemented, representation of a large quantity of numbers (for example, a decimal with many bits or even an irrational number) is limited by hardware (data ranges that can be represented by different bit widths are different). Therefore, that "the value of N" is the N1$^{th}$ power of 2" in this application needs to be understood as follows. The value of N' is not fully equal to the N1$^{th}$ power of 2" in all cases, but is equal to the N1$^{th}$ power of 2 based on a specific hardware limitation (such as a specific bit width). In other words, a final result may be that the value of N' is exactly equal to the N1$^{th}$ power of 2, or may be approximately equal to the N1$^{th}$ power of 2. Other various operations below in this application are also based on the same principle, and details are not described subsequently.

The multiplication hardware circuit further includes the shift subcircuit configured to shift, based on a value M1 of an integral part of c1, N' obtained by the exponentiation operation subcircuit, to obtain an absolute value of C1, where C1 is a product by multiplying A1 and B1. It should be noted that shifting a bit of a negative number to the left (for example, shifting to the left by 3 bits) in this application indicates shifting the negative number to the right by bits of an absolute value of the negative number (for example, shifting to the right by |−3| bits, in other words, shifting to the right by 3 bits). On the contrary, shifting a bit of a negative number to the right indicates shifting the negative number to the left by bits of an absolute value of the negative number.

The multiplication hardware circuit further includes the sign bit determining subcircuit configured to determine a positive/negative sign of C1 based on a value of a sign bit of a1 and a value of a sign bit of a2, and obtain C1 based on the absolute value of C1 obtained by the shift subcircuit and the positive/negative sign of C1. A sign of C1 is essentially determined by signs of A1 and B1, and signs of a1 and a2 are determined by the signs of A1 and B1. Therefore, the sign of C1 may be determined by the signs of the two pieces of data a1 and a2 obtained by the logarithmic field adder. A determining principle is a technology well known to a person skilled in the art. To be specific, if a number is positive and a number is negative, a multiplication result is negative. If two numbers are positive or negative, a multiplication result is positive.

In other approaches, if two numbers V that equal to $(-1)^S \times \text{Fraction} \times 2^{Exp}$ are multiplied, a method is multiplying two Fraction (fraction) parts, adding two Exps (exponent), and then adding Fraction multiplication result shift exponents to obtain a sum. It may be considered that the two Fractions are multiplied in a linear field. If both of the two Fractions are represented using 11 bits, there needs to be an 11-bit×11-bit multiplier. Costs of implementing this multiplier are relatively large. For example, a large quantity of logical resources are occupied, and an area and power consumption increase.

However, in the third aspect, multiplication is implemented using the exponentiation operation subcircuit, the shift subcircuit, and the sign bit determining subcircuit. In this case, a complex exponentiation operation subcircuit is not required. Compared with a multiplication circuit, implementation of these subcircuits saves more resources and occupies less logical resources, thereby reducing an area occupied by a device and power consumption.

For addition FP16 (floating point 16) bit addition costs a lot. For example, if two numbers V1 that equals to $(-1)^S \times \text{Fraction1} \times 2^{Exp1}$ and V2 that equals to $(-1)^S \times \text{Fraction2} \times 2^{Exp2}$ are to be added, the two numbers cannot be directly added because the exps are different.

(1) Perform decimal point alignment, determine a larger value in exp1 and exp2, and then change a smaller value to the larger value.

For example, if exp1=5, and exp2=3, change V2 to V2 that equals to $(-1)^S \times (\text{Fraction2} \times 2^{Exp2-Exp1}) \times 2^{Exp1}$.

(2) After the two Fraction parts are added, $(-1)^S(\text{Fraction1} + (\text{Fraction2} \times 2^{Exp2-Exp1})) \times 2^{Exp1}$ is obtained.

(3) Perform normalization processing on (Fraction1+ (Fraction2×$2^{Exp2-Exp1}$)) to obtain 1.xxx, and a shifted offset x is generated, and is added to $2^{Exp1+x}$.

(4) Represent $(-1)^S(\text{Fraction1} + (\text{Fraction2} \times 2^{Exp2-Exp1})) \times 2^{Exp1}$ in a 1.5.10 standard format 5-bit$^{Exp1+x}$, 10-bit xxx, and 1-bit sign bit.

With reference to the third aspect, in a first possible implementation of the third aspect, N' is a binary number formed by 1+w bits, and is used to represent a decimal greater than or equal to 1 and less than 2, where a number represented by 1 bit is a value of an integral part of the decimal, and a number represented by w bits is a value of a fractional part of the decimal.

The shift circuit is further configured to shift N' to the left by M1−(w−k) bits to obtain a final shift result. Rightmost k bits of the final shift result are used to indicate a value of a fractional part of the absolute value of C1, and j bits on the left of the rightmost k bits of the final shift result are used to indicate a value of an integral part of the absolute value of C1.

With reference to the third aspect, in a second possible implementation of the third aspect, N' is a binary number formed by 1+w bits, and is used to represent a decimal greater than or equal to 1 and less than 2, where a number represented by 1 bit is a value of an integral part of the decimal, and a number represented by w bits is a value of a fractional part of the decimal. The shift subcircuit includes a first shift subcircuit and a second shift subcircuit.

The first shift subcircuit is configured to shift N' to the left by M1 bits. Note shifting a negative digit to the left is actually shifting a positive digit to the right.

The second shift subcircuit is configured to shift the result obtained after the first shift subcircuit performs shifting to the left by −(w−k) bits to obtain a final shift result. Rightmost k bits of the final shift result are used to indicate a value of a fractional part of the absolute value of C1, and j bits on the left of the rightmost k bits of the final shift result are used to indicate a value of an integral part of the absolute value of C1.

With reference to the third aspect and the possible implementations of the third aspect, in a third possible implementation, the exponentiation operation subcircuit is a decoding subcircuit, and the decoding subcircuit is configured to obtain N' based on N1 of c1 through decoding, or the exponentiation operation subcircuit is a table lookup subcircuit, and the table lookup subcircuit is configured to obtain N' based on N1 of c1 through table lookup.

With reference to the third aspect and the possible implementations of the third aspect, in a fourth possible implementation, the multiplication hardware circuit further includes an accumulator configured to perform an accumulation operation on C1 and another piece of linear field data C2 from the multiplication hardware circuit, or the accumulator is configured to perform an accumulation operation on C1 and linear field data C3 from another multiplication hardware circuit.

According to a fourth aspect, this application discloses a system-on-a-chip (SoC), including a processor core, a multiplication hardware circuit array consisting of one or more multiplication hardware circuits according to the first aspect and the implementations of the first aspect, a data input buffer, a data output buffer, and a control circuit.

The control circuit is connected to the processor core, the multiplication hardware circuit array, the data input circuit, and the data output circuit.

The data input circuit is configured to obtain data from the processor core using the control circuit.

The multiplication hardware circuit array is configured to obtain data in the data input buffer for processing, obtain a processed result, and output the processed result to the data output buffer using the control circuit.

A composition of the multiplication hardware circuit array (that is, how many multiplication hardware circuits are selected, the multiplication hardware circuit array is formed in what manner, and the like) is another approach. This application does not focus on this. Specific implementation of the multiplication hardware circuit constituting the array is the focus of this application. In this application, the input buffer and the output buffer may be implemented by a storage medium such as a static random-access memory (SRAM) and an embedded dynamic random-access memory (eDRAM).

With reference to the fourth aspect, in a first possible implementation of the fourth aspect, the SoC further includes a logarithmic conversion circuit.

The logarithmic conversion circuit is configured to perform logarithmic field conversion on output of the multiplication hardware circuit array, and input a result obtained after conversion to the data input buffer. Specifically, the logarithmic conversion circuit obtains data from the output buffer, and then converts the data and outputs the data to the input buffer. In this way, subsequently, the multiplication hardware circuit array can obtain the data from the input buffer for operation.

With reference to the first possible implementation of the fourth aspect, in a second possible implementation of the fourth aspect, the logarithmic field conversion circuit includes an integer computing subcircuit, a decimal computing subcircuit, and a second sign bit determining subcircuit, where the linear field array output data is a binary number consisting of 1+j+k bits, both j and k are positive integers, 1 bit is a second sign bit, and is used to indicate a positive/negative sign S, j bits are used to indicate a value J of an integral part of an absolute value of the linear field data, and k bits are used to indicate a value K of a fractional part of the absolute value of the linear field data.

The integer computing subcircuit is configured to calculate a difference between hi and k based on a value hl of a quantity of bits in which a non-zero highest bit of the binary number of j+k bits of the linear field array output data is located, where the difference is used to indicate a value of an integral part of a result obtained by calculating a logarithm to base 2 of an absolute value of the linear field array output data, and a lowest bit of the binary number of j+k bits of the linear field array output data is denoted as a $0^{th}$ bit.

The decimal computing subcircuit is configured to obtain, based on a predetermined quantity of s (s is greater than or equal to k, and 0 is filled if the quantity is less than s) bits after the non-zero highest bit from a high bit to a low bit of the linear field array output data, a value of a fractional part of the result obtained by calculating the logarithm to base 2 of the absolute value of the linear field array output data. Specifically, the value may be obtained in a table lookup or decoding method.

The second sign bit determining subcircuit is configured to separately determine, based on a sign of the linear field array output data, a sign of the logarithmic field array output data in order to obtain the logarithmic field array output data.

With reference to the second possible implementation of the fourth aspect, in a third possible implementation of the fourth aspect, it is assumed that A1 and A2 mentioned in the foregoing aspects are the linear field array output data, the decimal computing subcircuit is further configured to compare a value corresponding to s bits after the non-zero highest bit from a high bit to a low bit of A1 with preset $2^n$ comparison values, where an $i^{th}$ comparison value is less than an $(i+1)^{th}$ comparison value, and the $i^{th}$ comparison value corresponds to one value $N_i$, when the value corresponding to s bits after the non-zero highest bit from the high bit to the low bit of A1 is greater than or equal to a $T^{th}$ comparison value, and is less than a $(T+1)^{th}$ comparison value, determine that N1 is $N_{T1}$, compare a value corresponding to s bits after the non-zero highest bit from a high bit to a low bit of A2 with the preset $2^n$ comparison values, where the $i^{th}$ comparison value is less than the $(i+1)^{th}$ comparison value, and the $i^{th}$ comparison value corresponds to one value $N_i$, and when the value corresponding to s bits after the non-zero highest bit from the high bit to the low bit of A2 is greater than or equal to a T2 comparison value, and is less than a $(T_2+1)^{th}$ comparison value, determine that N2 is $N_{T2}$.

With reference to the second possible implementation of the fourth aspect, in a fourth possible implementation of the fourth aspect, the decimal computing subcircuit may further have another implementation, to be specific, the decimal computing subcircuit is further configured to compare a value corresponding to high x bits of s bits after the non-zero highest bit from a high bit to a low bit of A1 with preset $2^n$ intervals, where an $i^{th}$ interval corresponds to a pair of values $\alpha i$ and $\beta i$, x is greater than 0 and less than s, when the value corresponding to the high x bits of s bits after the non-zero highest bit from the high bit to the low bit of A1 falls into a first interval, find a pair of values $\alpha 1$ and $\beta 1$ corresponding to the first interval, calculate a result of $x \times \alpha 1 + \beta 1$, and obtain the N1 based on the result of $x \times \alpha 1 + \beta 1$, compare a value corresponding to high x bits of s bits after the non-zero highest bit from a high bit to a low bit of A2 with the preset $2^n$ intervals, and when the value corresponding to the high x bits of s bits after the non-zero highest bit from the high bit to the low bit of A2 falls into a second interval, find a pair of values $\alpha 2$ and J2 corresponding to the second interval, calculate a result of $x \times \alpha 2 + \beta 2$, and obtain the N2 based on the result of $x \times \alpha 2 + \beta 2$.

According to a fifth aspect, this application discloses an electronic device (which may be any electronic device such as a mobile phone, a tablet, a smartwatch, or a smart television (TV)), including the SoC according to the second aspect and the implementations of the second aspect (or the fourth aspect and the implementations of the fourth aspect) and a memory.

The memory is configured to store an instruction required for program running.

The processor core in the SoC is configured to execute the instruction to run a program, and send data that needs to be processed to the multiplication hardware circuit array.

The multiplication hardware circuit is configured to, after the data is processed, output a result obtained after processing to the data output circuit, and finally enable the processor core to obtain the result.

DESCRIPTION OF EMBODIMENTS

Figure 1:
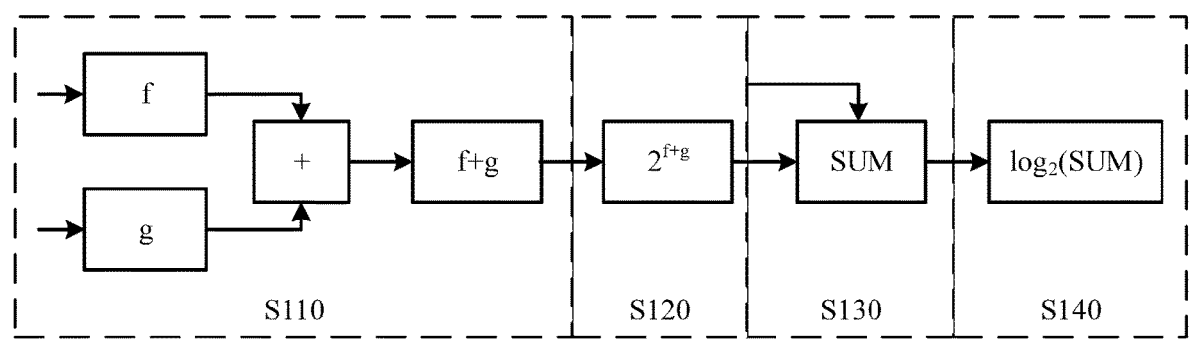
FIG. 1 is a schematic diagram of a multiply-accumulate operation.

Based on aspects and related implementations of the aspects in the summary, the following specifically describes the technical solutions in this application with reference to the accompanying drawings.

When a matrix operation is abstracted into a mathematical mode, the matrix operation may be a multiply-accumulate operation, or may be referred to as a multiply-add operation. Both P and Q may represent a matrix or a vector. P·Q may represent a generalized matrix operation, including at least one of convolution operations matrix×vector, matrix×matrix, and vector x vector. A value of P·Q may be a product $p_i q_i$ obtained by performing a multiplication operation on an element $p_i$ in P and a corresponding element $q_i$ in Q, and then an accumulation operation is performed on these products. This process is the multiply-accumulate operation. An element of a result matrix is obtained through the multiply-accumulate operation.

Because an operation amount of multiplication is large in the multiply-accumulate operation, in an existing solution, a logarithmic operation system is used, to be specific, data is converted from a linear field to a logarithmic field (log field) to perform a representation and operation. In this application, the logarithmic field and the linear field refer to two different data representation formats. The logarithmic field is relative to the linear field. To be specific, data represented using the logarithmic field (referred to as "logarithmic field data" below, "logarithm data", "a logarithm value", "a logarithmic field value", or the like) refers to data that is obtained by converting an absolute value of data represented using the linear field (referred to as "linear field data" below, "linear data", "a linear value", "a linear field value", or the like) into a logarithm value through a logarithm operation (for convenience of computer calculation, a logarithm operation in which 2 is used as a base is usually performed, in other words, a $\log_2(|x|)$ operation is performed, where x refers to linear field data) and that is represented using a sign bit.

For example, to calculate a product F×G (both F and G are positive numbers) of data F and data G, a logarithmic field representation format of the data F and the data G may be first calculated. When $\log_2(F)=f$, and $\log_2(G)=g$, $F \times G = 2^f \times 2^g = 2^{f+g}$. In this case, f and g are logarithmic field data, and correspondingly, F and G are linear field data. Multiplication of the linear field data F and G may be converted into an addition operation of the logarithmic field data f and g through the foregoing conversion, to be specific, f+g is the logarithmic field representation format of the product F×G. The value of the product F×G may be obtained by converting the logarithmic field result f+g into the linear field data (that is, $2^{f+g}$ is calculated in a manner such as shifting or circuit decoding). According to the foregoing method, multiplication of data may be changed into addition in which a logarithm to base 2 of an absolute value of the data is calculated in order to avoid a multiplication operation. Although specific overheads are required for performing the logarithm operation, one piece of data may participate in a plurality of times of multiplication in the matrix operation. Therefore, data in logarithmic field representation is calculated once, and is subsequently used for a plurality of times. For an entire matrix operation, calculation overheads are also reduced.

In an existing matrix operation procedure, a floating-point data representation format in the IEEE-754 standard of the institute of electrical and electronics engineers (IEEE) is used, for example, a half-precision 16-bit floating-point data representation format (or a single-precision 32-bit floating-point data representation format is used) is used.

FIG. 1 is a schematic diagram of a multiply-add operation, and steps the multiply-add operation are as follows.

S110. Input two pieces of data in a logarithmic field representation format, for example, f and g are respectively obtained after linear field data F and G are converted into logarithmic field data, and f and g may be data in a 16-bit floating-point data representation format such that a linear field multiplication operation F×G is converted into a logarithmic field addition operation f+g.

S120. Calculate $2^{f+g}$ using a standard floating-point exponentiation operation circuit based on an addition result (namely, f+g) in a logarithmic field, where a calculation result is still in the 16-bit floating-point data representation format.

S130. Perform an addition operation on the data in the 16-bit floating-point data representation format in S120 and other data in the same 16-bit floating-point data representation format to obtain an accumulated sum (SUM) that is still in the 16-bit floating-point data representation format.

In other approaches, if two numbers V that equal to $(-1)^S \times \text{Fraction} \times 2^{Exp}$ are multiplied, a method is multiplying two Fraction parts, adding two Exps, and then adding Fraction multiplication result shift exponents to obtain a sum. It may be considered that the two Fractions are multiplied in a linear field. If both of the two Fractions are represented using 11 bits, there needs an 11-bit×11-bit multiplier. Costs of implementing this multiplier are relatively large. For example, a large quantity of logical resources are occupied, and an area and power consumption increase.

However, in this application, multiplication is implemented using an exponentiation operation subcircuit, a shift subcircuit, and a sign bit determining subcircuit. In this case, a complex exponentiation operation subcircuit is not required. Compared with a multiplication circuit, implementation of these subcircuits saves more resources and occupies less logical resources, thereby reducing an area occupied by a device and power consumption.

For addition FP16 (floating point 16) bit addition costs a lot. For example, if two numbers V1 that equals to $(-1)^S \times \text{Fraction1} \times 2^{Exp1}$ and V2 that equals to $(-1)^S \times \text{Fraction2} \times 2^{Exp2}$ are to be added, the two numbers cannot be directly added because exps are different, and the following operations need to be performed.

(1) Perform decimal point alignment, determine a larger value in exp1 and exp2, and then change a smaller value to the larger value.

For example, if exp1=5, and exp2=3, change V2 to V2 that equals to $(-1)^S \times (\text{Fraction2} \times 2^{Exp2-Exp1}) \times 2^{Exp1}$.

(2) After the two Fractions are added, $(-1)^S(\text{Fraction1}+(\text{Fraction2} \times 2^{Exp2-Exp1})) \times 2^{Exp1}$ is obtained.

(3) Perform normalization processing on $(\text{Fraction1}+(\text{Fraction2} \times 2^{Exp2-Exp1}))$ to change to 1.xxx. In this process, a shifted offset x (may be positive or negative) may be generated. In this case, the offset x needs to be added to $2^{Exp}$, to obtain $2^{Exp1+x}$.

(4) Represent $(-1)^S(\text{Fraction1}+(\text{Fraction2} \times 2^{Exp2-Exp1})) \times 2^{Exp1}$ in a 1.5.10 standard format 5-bit$^{Exp1+x}$, 10-bit xxx, and 1-bit sign bit.

In many scenarios, a single multiply-add result is not a final result of a matrix operation. For example, in a neural network operation, a result (SUM) of a multiply-accumulate operation may become a piece of data used for calculation at a next layer and needs to be converted into a representation format in a logarithmic field. For example, a standard floating-point logarithm operation circuit may be used to calculate $\log_2(\text{SUM})$, and a result is saved in a 16-bit floating-point data representation format.

In an existing matrix operation procedure, a standard floating-point data representation format is used, and a data representation bit width is relatively large, for example, 16 bits or 32 bits. The floating-point data representation format V usually includes a sign bit S, an exponential bit Exp, and a significant digit Fraction, and $V=(-1)^S \times \text{Fraction} \times 2^{Exp}$. This floating-point data representation format is relatively complex, and is not conducive to fast data conversion between a linear field and a logarithmic field.

In addition, hardware resource consumption of a standard floating-point exponentiation operation unit and a standard floating-point logarithm operation unit is high, and in floating-point data representation, resource consumption of an accumulator that calculates an accumulated sum is also high.

Based on the foregoing problems, this application provides a data format conversion method, a circuit, a computing engine, and a convolution computing chip such that overheads during data conversion between a linear field and a logarithmic field can be reduced, and a speed of convolution calculation is improved.

Figure 2:
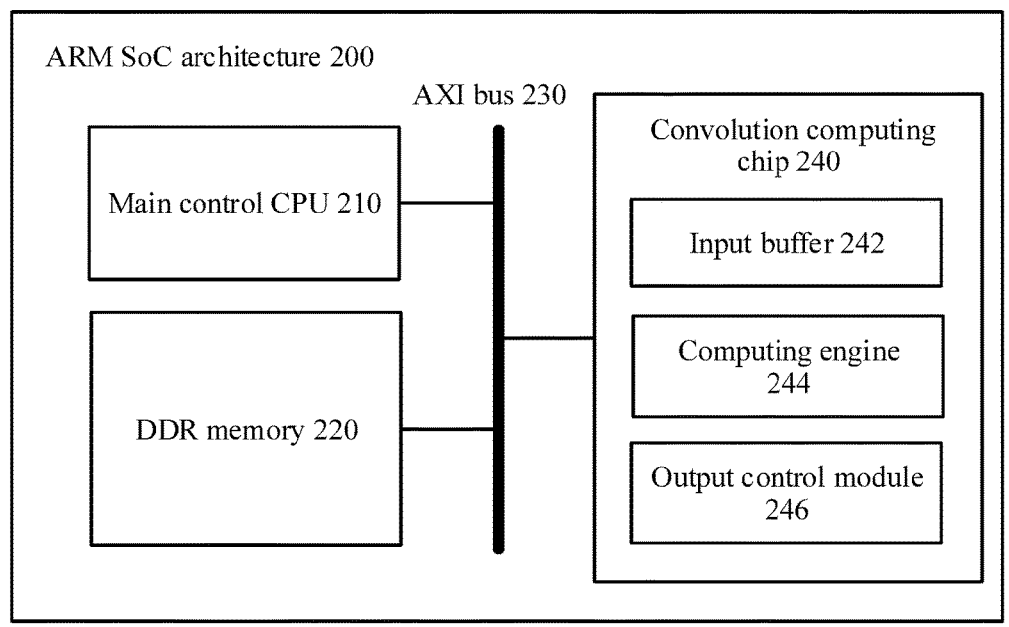
FIG. 2 is a schematic block diagram of an ARM SoC architecture according to an embodiment of this application.

The following first describes a hardware architecture in an embodiment of this application. In this embodiment of this application, a scenario in which convolutional neural network (CNN) computing is used in a mobile phone chip is used as an example for description. FIG. 2 is a schematic block diagram of an ARM SoC architecture 200 according to an embodiment of this application.

As shown in FIG. 2, the ARM SoC architecture 200 includes, for example, a main control central processing unit (CPU) 210, a double data rate (DDR) memory controller 220, an advanced extensible interface (AXI) bus 230, and a hardware calculation module 240.

The hardware calculation module is configured to perform some dedicated data processing, to be specific, the hardware calculation module is configured to perform some "dedicated" processing (for example, neural network-based machine learning) on data such as an image or audio data. Compared with a general purpose processor (for example, a CPU), a most important feature of the hardware calculation module is that implementation is based on various logic circuits (for example, an AND gate, an OR gate, and a NOT gate). The CPU has a specific instruction set (for example, an x86 instruction set and an ARM instruction set), and completes data processing in a manner of executing an instruction. A typical hardware calculation module may be implemented based on an FPGA, an ASIC, and the like.

The CPU usually has its own dedicated instruction set for performing, in a manner of executing an instruction, other data processing than the dedicated data processing performed by the hardware calculation module (certainly, in theory, it is not limited to using the CPU to perform the dedicated data processing performed by the hardware calculation module, but limited by a CPU hardware architecture, efficiency is relatively low).

The DDR memory is also referred to as a DDR synchronous dynamic random access memory (SDRAM), namely, a DDR synchronous dynamic random access memory SDRAM. As shown in FIG. 2, a convolution computing chip 240 includes an input buffer 242, a computing engine 244, and an output control module 246. The CPU 210 controls computing and starting using the AXI bus 230. The convolution computing chip 240 obtains, from the DDR memory 220 using the AXI bus 230, data that needs to be processed (for example, obtains image data and a training parameter for an image processor), and then sends the data to the computing engine 244. The computing engine 244 calculates based on input data content, writes a calculation result back to the DDR memory 220, and notifies the CPU 210 that calculation is completed.

Figure 3:
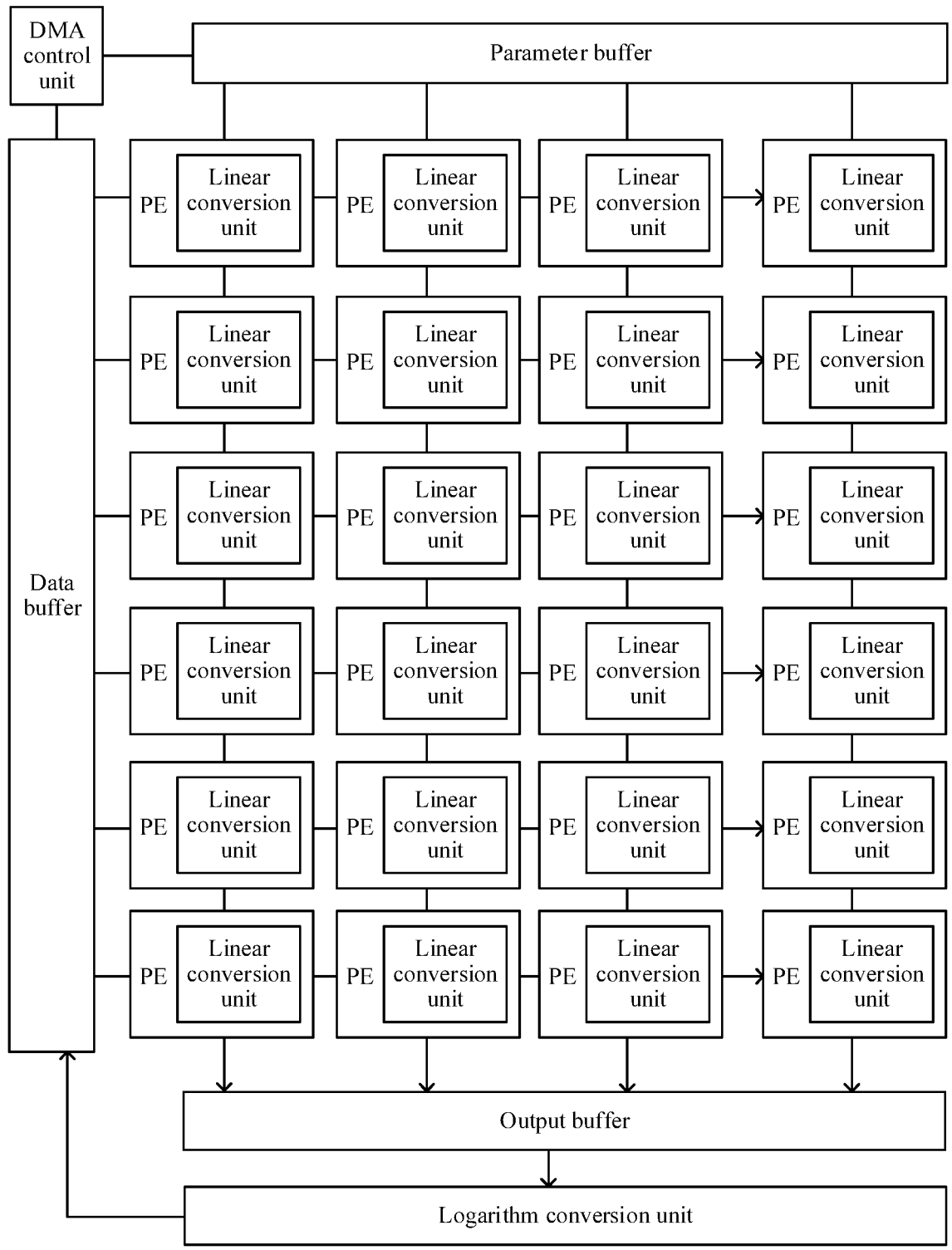
FIG. 3 is a schematic block diagram of a structure of a computing engine.

An improvement in this embodiment of this application lies in the computing engine 244 (which may exist in a form of an intellectual property (IP) core. In addition, the IP core may also include more circuits, such as the input buffer 242). FIG. 3 is a schematic block diagram of a structure of a computing engine. As shown in FIG. 3, the computing engine 244 includes a direct memory access (DMA) control unit, a data buffer, a parameter buffer, a plurality of processing elements (PE) (to form a PE array), an output buffer, and a logarithmic conversion circuit. The data buffer and the parameter buffer may be considered as an input buffer, and are used to cache image data and a training parameter. The image data and the training parameter may be considered as data.

The PE may be considered as a circuit used to implement a specific function. For example, in this application, the PE may include a multiplication hardware circuit, and may perform various multiplication-based operations (for example, a multiplication operation or a multiply-add operation). The multiplication hardware circuit (PE) includes a linear conversion circuit (also referred to as a linear conversion unit, and is represented by the linear conversion unit in FIG. 3). A composition of the PE array (namely, the multiplication hardware circuit) is another approach. For example, the PE array may be formed in a manner shown in FIG. 3. In this case, PEs at a first level (a first column and a first row) in the array transmit data to a subsequent PE, and each PE may also be connected to the input buffer (the parameter buffer and the data buffer).

In a computing process of the computing engine 244, the DMA control unit (which may be considered as a control circuit) reads required image data and a required training parameter from an external DDR memory 220 to the data buffer and the parameter buffer. The multiply-add operation is performed on the image data and the training parameter using the PE array. An operation result is output to the output buffer, and then the operation result is converted from a linear field to a logarithmic field using the logarithmic conversion circuit. A final result may be returned to the data buffer as input data for a next multiply-add operation, or directly output to the DDR memory 220 for storage.

Embodiment 1

Figure 4:
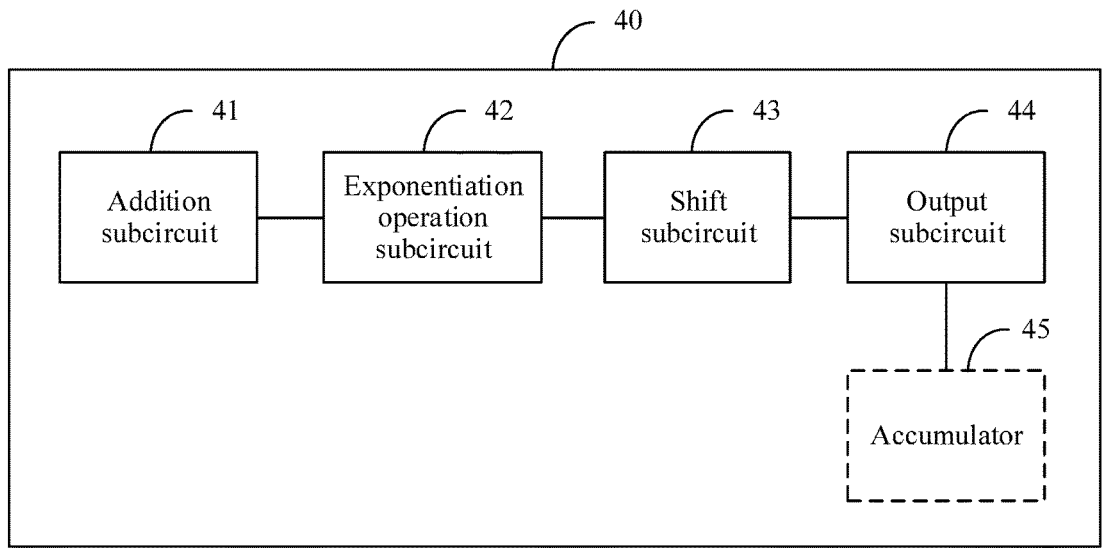
FIG. 4 is a schematic structural diagram of a multiplier according to Embodiment 1 of this application.

FIG. 4 is a schematic structural diagram of a hardware multiplier 40 (also referred to as a "multiplication hardware circuit", a "multiplication circuit", and a "multiplier" in this application) in an embodiment. The multiplier may be configured to perform a multiplication operation on two pieces of data A and B. The multiplier includes an addition subcircuit 41 configured to obtain logarithmic field data a and logarithmic field data b that are respectively corresponding to A and B, and perform an addition operation on a and b to obtain c, where c includes an integral part and a fractional part, an exponentiation operation subcircuit 42 configured to perform an exponentiation operation in which a base is 2 and an exponent is the fractional part of c, to obtain an exponentiation operation result, a shift subcircuit 43 configured to shift the exponentiation operation result based on the integral part of c to obtain a shift result, where the shift result is used to indicate a product of A and B, and an output subcircuit 44 configured to output the product of A and B based on signs of a and b and with reference to the shift result.

In addition, the multiplication circuit 40 may further include an accumulator 45 configured to perform an accumulation operation on the product of the data A and the data B and another piece of data from a same multiplication circuit, or configured to perform an accumulation operation on the product of the data A and the data B and a product from another multiplication circuit.

The foregoing subcircuits may be implemented based on an ASIC or an FPGA. In a typical example, the hardware multiplier is implemented based on the ASIC. In addition, the hardware multiplier may be encapsulated in a chip with other hardware such as a CPU and a graphics processing unit (GPU) to form an SoC. In this embodiment, a very simple circuit may be used for implementation of each subcircuit such that few resources are occupied. In this way, implementation of an entire multiplier is also very simple, and few resources are occupied such that more multipliers can be integrated into a chip in a same resource (for example, an area or power consumption), thereby improving an operation capability of the chip.

The following describes the subcircuits using various embodiments.

Embodiment 2

Based on the foregoing embodiments, an addition subcircuit 41 is specifically described in this embodiment.

The addition subcircuit 41 is configured to add an absolute value of logarithmic field data a and an absolute value of logarithmic field data b to obtain c. Both a and b are logarithmic field data, and are obtained by separately performing logarithmic field conversion on linear field data A and B.

In this application, a logarithmic field includes 1+m+n binary bits (which may also be represented as 1.m.n), where both m and n are positive integers, a first bit is a sign bit, and is used to indicate a positive/negative sign (referred to as "sign" below, which is not distinguished in this application), m bits are an integral part (or the m bits are used to indicate a value of the integral part), and n bits are a fractional part (or the n bits are used to indicate a value of the fractional part). Values of m and n may be determined based on precision required by a system. A larger quantity of bits indicates higher precision. However, some hardware resources are correspondingly increased. A person skilled in the art may select proper values of m and n with reference to a requirement of the system on precision and a hardware resource.

It may be understood that adding means adding a fractional part of the absolute value of a and a fractional part of the absolute value of b to obtain a fractional part of c (there may be a carry bit), and adding an integral part of the absolute value of a and an integral part of the absolute value of b to obtain an integral part of c (a carry bit may be also added). The integral part of c and the fractional part of c are also represented based on m+n binary bits.

In this application, a purpose of logarithmic field conversion is to convert data into a logarithmic format, and then perform an operation based on the data in the logarithmic format. Logarithmic field data is relative to linear field data. If logarithmic field conversion is performed on data (such as A or B mentioned above) to obtain other data (such as a or b mentioned above), the data (A or B) obtained before the logarithmic field conversion is referred to as the linear field data, and the data (a or b) obtained after the conversion is referred to as the logarithmic field data.

Specific logarithmic field conversion may include a plurality of implementations. The following describes two implementations in detail.

Manner 1

In an implementation, the logarithmic field conversion may mean that a logarithm to base 2 of an absolute value of linear field data is calculated and represented with reference to a sign bit. It may be understood that, in specific implementation of "representing with reference to a positive/negative sign bit of the data", a simplest method is directly using the sign bit of the data as a sign bit of data obtained after the logarithmic field conversion. Certainly, an opposite sign may alternatively be used as the sign bit of the data obtained after the logarithmic field conversion. Subsequently, as long as this conversion rule is remembered, mutual conversion between logarithmic field data and linear field data can be implemented.

Figure 6:
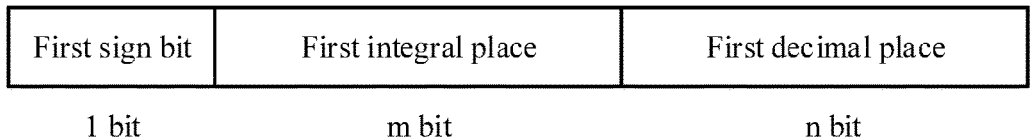
FIG. 6 is a schematic diagram of a logarithmic field representation format according to an embodiment of this application.

In this application, as shown in FIG. 6, logarithmic field data is represented as binary data of 1+m+n bits, and is also denoted as 1.m.n below. Both m and n are positive integers, 1 bit is a first sign bit S, and is used to indicate a positive or negative value of data, m bits are an integral place, and are used to indicate a value M of an integral part of a logarithm to base 2 of an absolute value of the data, and n bits are a decimal place, and are used to indicate a value N of a fractional part of the logarithm to base 2 of the absolute value of the data.

A basic relationship of conversion between linear field data F and logarithmic field data (represented in the format of 1.m.n) is shown in the following formula $$F=(-1)^S 2^{M+N}=(-1)^S 2^N \ll M,$$

where "$\ll$" is a left shift symbol. Correspondingly, $\ll M$ represents shifting leftwards by M bits. Specifically, shifting leftwards by M bits means shifting leftwards by M bits when M is greater than 0, and shifting rightwards by bits of an absolute value of M when M is less than 0. The sign bit S represents a sign (positive or negative) of F, and does not participate in an operation of data in a logarithmic field representation format. When F is a negative number, because direct calculation of $\log_2$ (a negative number) in real number field is not established, the 1.m.n format (a logarithmic field representation format) in this embodiment of this application represents $-\log_2(|F|)$.

For example, for data −8, a logarithm to base 2 of an absolute value of −8 is calculated $\log_2|-8|=3$, and then −3 is obtained with reference to a positive/negative sign (−) of −8. In this case, −8 is referred to as linear field data, and −3 is referred to as logarithmic field data. Correspondingly, in addition to logarithmic field conversion, linear field conversion may alternatively be performed on the data in turn (to be specific, an absolute value power of the data is raised to 2, and a result is represented with reference to a sign bit of the data). For example, for −3, a −31 power to 2 is equal to 8, and then −8 is obtained with reference to a sign bit (−).

When conversion is performed in manner 1, and when a logarithm to base 2 of an absolute value of linear field data is calculated, the result may be a positive number, or may be a negative number (for example, $\log_2(0.25)=-2$ is calculated). In this case, to indicate whether one piece of data is a positive or a negative number, one bit in m bits used to indicate an integral part of logarithmic field data may be used to represent a sign. The bit is referred to as a sign bit of the integral part in a logarithmic field. A value of remaining m−1 bits is equal to an absolute value of the integral part of a result obtained by calculating a logarithm to base 2 of an absolute value of the data.

For example, a result is obtained by calculating a logarithm to base 2 of decimal data 0.25 ($\log_2(0.25)=-2$), namely, M=−2. A highest bit of a 3-bit integral place in a logarithmic field representation format 1.3.2 is used as a sign bit of an integral part in a logarithmic field. Therefore, the decimal data 0.25 is represented as 0 110 00 in the logarithmic field representation format 1.3.2. A highest bit 1 (to be specific, on the leftmost side) in 110 is the sign bit of the integral part in the logarithmic field, and 1 is used to represent a negative number (0 represents a positive number).

In manner 1, a value of the integral part of the logarithmic field data is positive or negative after the logarithmic field conversion. This truly reflects that a logarithm to base 2 of an absolute value of linear field data is calculated. However, existence of one sign bit causes a bit of waste on m bits of the integral part in a logarithmic field (a bit width becomes larger). In addition, a sign bit needs to be considered in calculation, and this also causes a little more overheads.

Manner 2

In another implementation, the logarithmic field conversion may mean that a logarithm to base 2 of an absolute value of linear field data is calculated, and the logarithm is converted into a number greater than or equal to 0 based on a base value and a result is represented with reference to a sign bit.

Optionally, a value of a first integral place may be a non-negative number, and the value of the first integral place is equal to a difference between a value M of an integral part of a result obtained by calculating a logarithm to base 2 of an absolute value of data (for example, F or G) and the base value (BASE).

Specifically, it may be understood that the value M of the integral part of the logarithm to base 2 of the absolute value of the linear field data may be a positive number or may be a negative number. For simplicity of data expression, it may be set that an integral place of logarithmic field data has no sign bit, and instead, a value of the integral place of the logarithmic field data, that is, M'=M−BASE, is used to represent original data M of a real integral part, and the value M' may be considered as an indication value, that is, the value is not really equal to "the value M of the integral part the logarithm to base 2 of the absolute value of the linear field data", but there is a correspondence (M'=M−BASE) between the value and M. To obtain the value M of the integral part the logarithm to base 2 of the absolute value of the data, calculation may be performed using M=M'+BASE. In other words, for different data, M corresponding to the data may be negative. To prevent the negative value from appearing in data expression, BASE is subtracted from M such that the value M' of the integral place of the logarithmic field data in a logarithmic field representation format is always kept as a non-negative number.

For example, in a simple example, a result is obtained by calculating a logarithm to base 2 of decimal data 0.25 ($\log_2(0.25)=-2$), namely, M=−2. If the value of BASE is −2, M'=M−(BASE)=−2−(−2)=0. Therefore, the decimal data 0.25 is represented as 000000 in the logarithmic field representation format 1.3.2.

In this application, values of BASE may also be different for different data (for example, different types of data or data in different time periods). A value principle of the base value BASE may be that M' corresponding to all data (for example, data of a batch) to which the base value BASE is applicable is a non-negative number. For example, when a range of the original data M of the real integral part of a batch of data with a specific attribute is −7 to 0, m is 3 bits. In this case, BASE may be set to a non-negative range in which M' starts from 0, to be specific, BASE may be set to −7. Therefore, it can be ensured that a value (M'=M−(−7)) of the integral place of the logarithmic field data is 0 to 7. Certainly, in another embodiment, a number such as −8 may alternatively be set (a corresponding range of M' is 1 to 8), provided that M' is not finally a negative number.

In addition, in some application scenarios, range limitation processing may be further performed on the value of M' in order to limit the value of M' between a minimum value and a maximum value. The minimum value is taken if a number is less than the minimum value, and the maximum value is taken if a number is greater than the maximum value. For example, the example in which when the range of the original data M is −7 to 0, m is 3 bits is still used. It is assumed that in this case, the value of M' is [−2, 5] when the value of BASE is −5. In this case, the value of M' may be limited to a range of [0, 3] using a circuit. If the value of M' is less than 0 (for example, −1 or −2), 0 is taken. If the value of M' is greater than 5 (for example, 6 or 7), 5 is taken. The range limitation processing may be performed on M', or may be performed on M such that M' can be finally within a predetermined range.

In this embodiment of this application, a selection of BASE is configurable. BASE may be configured using an external component of a linear conversion circuit, to be specific, BASE is transferred into the linear conversion circuit using the external component, and the BASE value is determined to be available in a compilation process of software in the linear conversion circuit.

It may be understood that, because the logarithmic field conversion is performed based on BASE, in a subsequent processing process (before an accurate result needs to be obtained), adaptive adjustment needs to be performed using BASE based on a result obtained through the conversion (because BASE is in the logarithmic field, adjustment is performed based on 2^BASE during adjustment) to obtain a correct result.

In manner 2 in which the logarithmic field conversion is performed based on BASE, a negative value can be prevented from appearing at the integral place of data expressed in the logarithmic field representation format. In this way, a sign bit does not need to be separately set for the integral place such that data expression is simpler, and operation overheads are saved (a sign bit does not need to be considered during an operation).

It may be understood that, the conversion in the foregoing two manners is performed in a non-zero case. When the data F=0, because $\log_2(F)$ is negative infinity, the 1.m.n format is not convenient for representation and subsequent calculation, and a special form may be used for representation. For example, a logarithmic field representation format of F=0 may be 100000..., to be specific, a first sign bit S is 1, and both values of a first integral place and a first decimal place are 0.

The following uses several specific examples to describe the logarithmic field representation format and a linear representation format of data in this embodiment of this application. For simplicity, assuming that the value M of the integral part of a logarithm to base 2 of an absolute value of data is non-negative, the value of BASE may be 0. Certainly, BASE may alternatively be −1 or another value less than −1. This is not limited in this embodiment of this application.

For example, the logarithmic field representation format is 1.3.2, and a binary representation format of data in the logarithmic field is 001010, where 1 bit (0) is used to represent a sign bit, 0 represents a positive number, 1 represents a negative number, 3 bits (010) are used to represent an integral part, and 2 bits (10) are used to represent a fractional part. A value of the data in binary is (+) 2^(0.10)<<(2-0)=(+) 101.10101, and is 010110101 in a linear representation format 1.3.5. In the linear field representation format, 1 bit (0) is used to represent a sign bit, 3 bits (101) are used to represent an integral part, and 5 bits (10101) are used to represent a fractional part.

Data is 101110 in the logarithmic field representation format 1.3.2. A value of the data in binary is (−) 2^(0.10) <<(3-0)=(−) 1011.0101, and is 110110101 in a linear representation format 1.4.4.

A maximum value of a positive number is 011111 in the logarithmic field representation format 1.3.2. A value of the data in binary is (+) 2^(0.11)<<(7-0)=(+) 11010111, and is 0 11010111 in a linear representation format 1.8.0.

A minimum value of a positive number is 000000 in the logarithmic field representation format 1.3.2. A value of the data in binary is (+) 2^(0.00)<<(0-0)=(+) 1.0000000, and is 0 1 0000000 in a linear representation format 1.1.7.

A maximum value of a negative number is 100001 in the logarithmic field representation format 1.3.2. A value of the data in binary is (−) 2^(0.01)<<(0-0)=(−) 1.0011000, and is 01 0000000 in the linear representation format 1.1.7.

A minimum value of a negative number is 111111 in the logarithmic field representation format 1.3.2. A value of the data in binary is (−) 2^(0.11)<<(7-0)=(−) 11010111, and is 111010111 in the linear representation format 1.8.0.

Therefore, in the logarithmic field representation format of data in this embodiment of this application, a smaller quantity of bits may be used to represent a large value range. In actual application, based on a characteristic of image data, a characteristic of a training parameter, and precision required for an intermediate result, a range of a minimum value of a negative number to a maximum value of a positive number that may be taken by data that needs to be expressed is estimated. Therefore, a value of m and a value of n in the logarithmic field representation format 1.m.n are determined. For example, a greater result obtained by calculating a logarithm to base 2 of an absolute value of the image data or the training parameter indicates a larger value of m, and a higher precision requirement indicates a larger value of n. It should be understood that a process of determining the value of m and the value of n may be implemented by software (for example, may be implemented using a general purpose processor such as a CPU). This is not limited in this embodiment of this application.

Embodiment 3

Based on the foregoing embodiments, an exponentiation operation subcircuit 42 is specifically described in this embodiment.

The exponentiation operation subcircuit 42 performs a 2^(a fractional part of c) operation. The "fractional part of c" refers to a decimal greater than or equal to 0 and less than 1. For example, if the fractional part of c is 0.32, an exponentiation operation of 2^0.32 (or $2^{0.32}$) is actually performed.

It should be noted that a calculation process in this application is usually erroneous, because when a digital circuit based on an ASIC and an FPGA is implemented, representation of a large quantity of numbers (for example, a decimal with many bits or even an irrational number) is limited by hardware and cannot be accurately expressed (for example, representation of a number is limited by a bit width). Therefore, it needs to be understood that an actual result of the "2^(a fractional part of c)" operation performed in this application is not fully equal to the "2^(a fractional part of c)" operation in all cases, but is equal to the "2^(a fractional part of c)" operation based on a specific hardware limitation (such as a specific bit width). In other words, a final result may be exactly equal to the "2^(a fractional part of c)" operation, or may be approximately equal to the "2^(a fractional part of c)" operation. Other various operations below in this application are also based on the same principle, and details are not described subsequently.

Specifically, the exponentiation operation subcircuit is a decoding subcircuit, and is configured to obtain an exponentiation operation result through decoding based on a fractional part of c. Alternatively, the exponentiation operation subcircuit may be a table lookup subcircuit, and is configured to obtain the exponentiation operation result through table lookup based on the fractional part of c. Regardless of the decoding subcircuit or the table lookup subcircuit, a general idea is that a mapping relationship between the "fractional part of c" and the "exponentiation operation result" is designed based on a specific precision value in advance. Subsequently, the "exponentiation operation result" is obtained based on the "fractional part of c" through decoding or table lookup.

Figure 10:
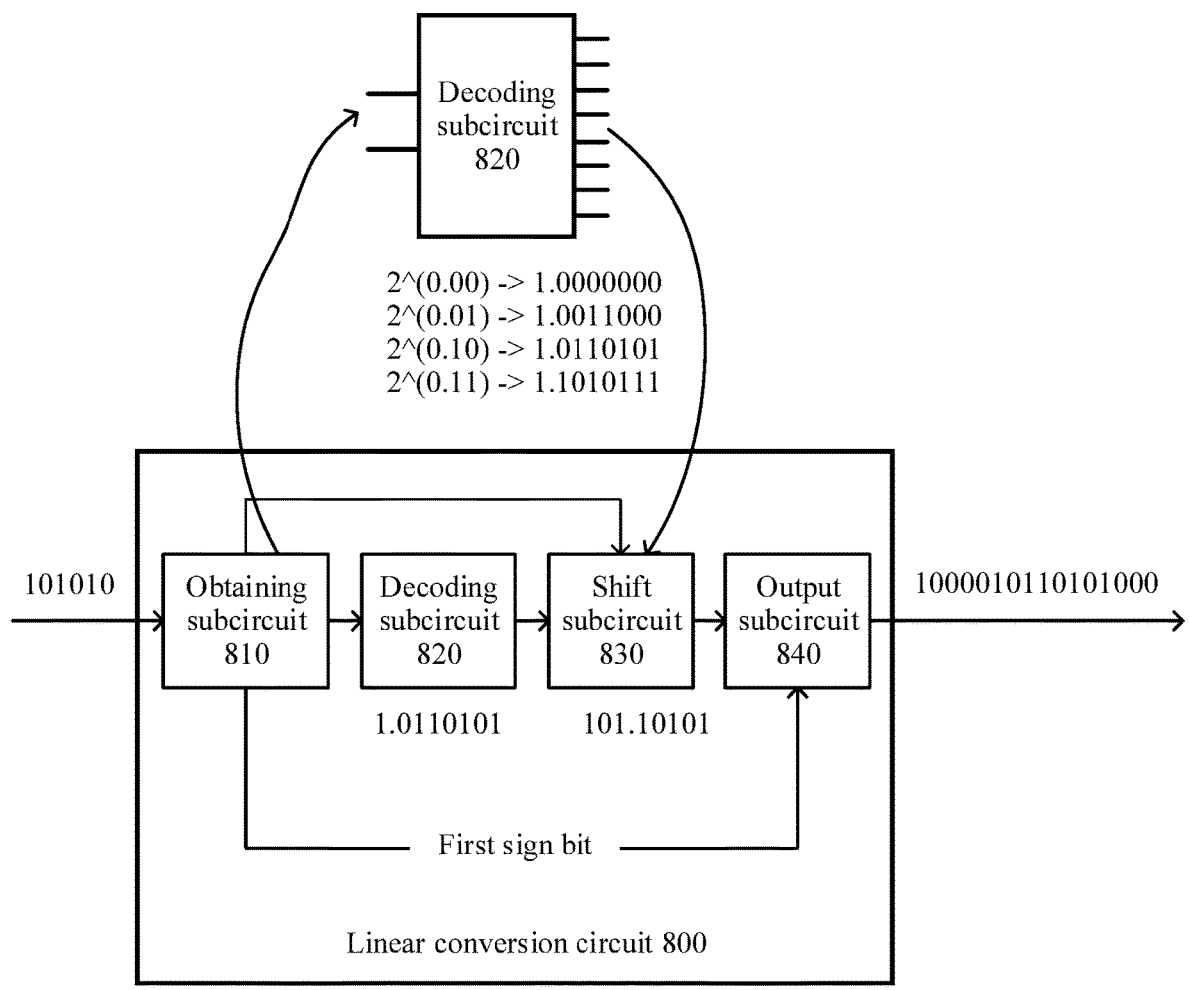
FIG. 10 is a schematic diagram of performing linear field conversion by a linear conversion circuit according to an embodiment of this application.

For example, in a specific example, an exponentiation operation subcircuit 42 may be a device with two-significant-bit input and eight-significant-bit output (for example, a decoder) shown in FIG. 10, capable of completing conversion between the "fractional part of c" and the "exponentiation operation result". It should be understood that the eight-significant-bit output is a case in this example, and a bit may be added or reduced based on an actual requirement.

Specifically, when n=2, for a first decimal place, there are four groups of different cases (00, 01, 10, and 11) in total. A result of $2^N$ is calculated in advance (N may be 0, 0.25, 0.5, or 0.75), and the result is rounded to 8 bits, and recorded and stored in a table as shown in FIG. 10 and the following:

00—10000000 (indicating a binary number 1.0000000 and corresponding to a decimal number 1.00), 01—10011000 (indicating a binary number 1.0011000 and corresponding to a decimal number 1.1875), 10—10110101 (indicating a binary number 1.0110101 and corresponding to a decimal number 1.4140625), and 11—11010111 (indicating a binary number 1.1010111 and corresponding to a decimal number 1.6796875).

Specific implementation of the two types of circuits is a technology well-known in the art, and details are not described in this application. In addition, implementation of the two types of circuits is also very simple, and few hardware resources are occupied.

Embodiment 4

Based on the foregoing embodiments, a shift subcircuit 43 is specifically described in this embodiment.

The shift subcircuit is essentially configured to shift an exponentiation operation result to the left by bits of an integral part of c, that is, perform a 2^(the integral part of c) exponentiation operation, to obtain a shift result. The shift result is equal to an absolute value of a product of A and B (certainly, due to a relationship between digital circuits, there is an error), and subsequently, a positive or negative sign bit is determined for the shift result to obtain a final product of A and B.

It may be understood that, when the shift subcircuit 43 performs shifting, a shifting manner of the shift subcircuit 43 needs to match a manner in which data is selected (to be specific, which bits are selected to be used as an integral part and which bits are selected to be used as a fractional part). When a finally obtained shift result of the shift subcircuit 43 is not obtained in a data selection manner that matches the shifting manner, the shift result is not a final result.

For example, binary 1 shifts three bits to the left, which is equivalent to multiplying by 2^3 in a decimal system and whose result is equal to a binary number 1000 (which is equivalent to a decimal number 8). In this case, a final result of the shift subcircuit is 1000. However, when a subsequent circuit obtains the result, if first two bits 10 in 1000 are used as the integral part and last two bits are used as the fractional part, a result 10.00 (a binary number) is obtained, and an error occurs obviously.

Therefore, in this application, that "the shift subcircuit is essentially configured to shift an exponentiation operation result to the left by bits of an integral part of c" means that a shifting manner (which needs to be coordinated with a corresponding data selection manner) in which 2^(the integral part of c) is obtained by shifting bits of the integral part of c to the left is matched in principle. However, in practice, a quantity of bits actually shifted may alternatively not be the integral part of c strictly, provided that there is a corresponding data selection manner for coordination such that a final obtained result is 2^(the integral part of c).

For example, if a binary number 1 needs to be "essentially" shifted to the left by three bits, in practice, the binary number 1 may alternatively be shifted to the left by five bits to obtain a binary number 100000. However, when a final result is taken, first four bits are used as an integral part, and last two bits are used as a fractional part. In this way, a correct result can also be obtained.

In this application, if no special description is provided, it may be considered that "shifting the exponentiation operation result to the left by bits of the integral part of c" is "essentially shifting the exponentiation operation result to the left by bits of the integral part of c to perform 2^(the integral part of c) operation".

Figure 7:
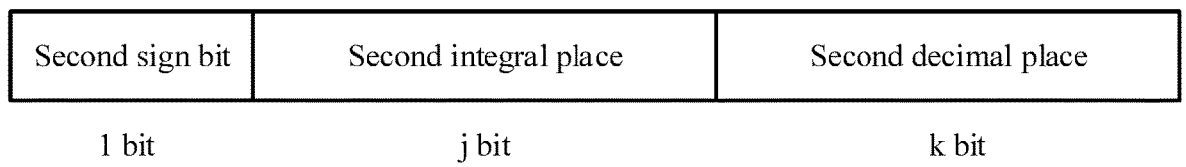
FIG. 7 is a schematic diagram of a linear representation format according to an embodiment of this application.

In an embodiment, referring to FIG. 7, linear field data is represented in a 1+j+k (or denoted as 1.j.k) format, to be specific, 1 bit is used to represent a sign, j bits are used to represent an integral part, and k bits are used to represent a fractional part. The shift result is equal to a product of A and B, and is linear field data. To better output linear field data that conforms to the 1+j+k format, a specific shifting method and a corresponding data selection method may be used below for implementation.

Specifically, in this application, the exponentiation operation result is equal to 2^(the fractional part of c), and it is determined, based on an exponentiation operation rule, that the number is greater than or equal to 1 and less than 2. In this embodiment, 1+w binary bits are used to represent the exponentiation operation result, where a first bit is an integral part (equal to 1), w bits are a fractional part, and w is a positive integer greater than or equal to 1.

Because the exponentiation operation result is a decimal that is greater than or equal to 1 and less than 2 and that is formed by 1+w bits, the exponentiation operation result may be represented as a decimal such as 1.01010 (binary, w=5). During storage, although a decimal point does not need to be stored, at a logical level, it may be considered that actually stored data of 1+w bits has a decimal point behind the first bit. If shifting is performed, it may be considered that a location of the decimal point is fixed, and a shifted number "passes" the decimal point.

For example, if a left shift of 2 bits is performed on 1.0101101, 1.0101101 is changed to 101.01101. If a left shift of (−3) bits is performed (for example, shifting 3 bits to the right), 1.0101101 is changed to 0.0010101101.

In an embodiment implemented using a specific hardware circuit, when the shift subcircuit is configured to shift the exponentiation operation result based on the integral part of c, the shift subcircuit is further configured to first place the exponentiation operation result in a memory of j+k bits, where a lowest bit of the exponentiation operation result is aligned with a lowest bit of j+k bits, and j+k is greater than or equal to 1+w, and then the exponentiation operation result is shifted to the left by X bits, where X is equal to the integral part of c minus (w−k). Correspondingly, when a final result is to be obtained, highest j bits of a shifted result are used as an integral part of the final result, and the remaining k bits are used as a fractional part of the final result. When a quantity of bits for the left shift is less than 0, shifting to the left by X bits is equal to shifting to the right by bits of an absolute value of X (for example, shifting to the left by (−3) bits is equivalent to shifting to the right by 3 bits).

Figure 8:
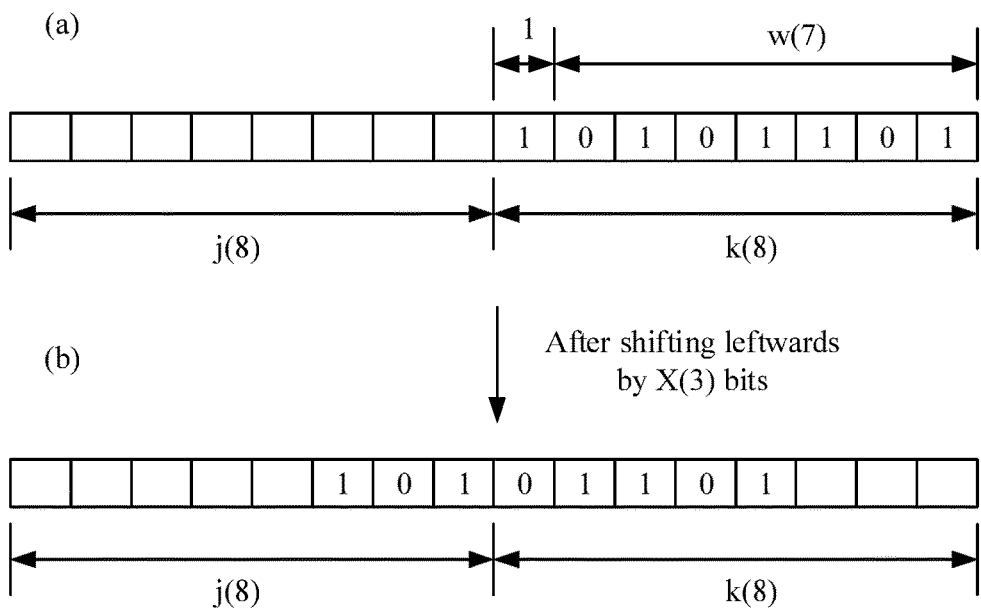
FIG. 8 is a schematic diagram of shifting performed by a shift subcircuit according to an embodiment of this application.

For example, it is assumed that w=7, the exponentiation operation result is 10101101 (which is a binary number 1.0101101 at the logical level), and the integral part of c is 2, j=8, and k=8. In this case, X=2−(7−8)=3. Referring to FIG. 8, a specific shifting method is as follows.

(1) As shown in FIG. 8(a), the exponentiation operation result 10101101 is first placed in the memory of j+k bits, that is, 8+8=16.

(2) A result obtained after the left shift is shown in FIG. 8(b). Data of high j(8) bits (representing the integral part of the final result) is (00000)101 (a number in parentheses indicates that a part less than 8 bits is supplemented with 0). Data of low k(8)bits (representing the fractional part of the final result) is 01101(000) (a number in parentheses indicates that a part less than 8 bits is supplemented with 0). That is, the final result is 00000101.01101000.

It should be noted that, in this embodiment, a value of a sign bit of linear field data is not determined by the shift subcircuit, but is determined by a next-level output subcircuit based on signs of logarithmic field data a and b.

It can be seen that, in the foregoing shifting manner, the final result obtained is the result 101.01101 obtained after shifting 1.0101101 to the left by bits of the integral part of c (to be specific, shifting 2 bits to the left) (the complete result is represented as 0000010101101000 using 8+8 bits). Based on the foregoing implementation, when a shift result needs to be obtained subsequently, a value of the integral part and/or the fractional part may be obtained in a uniform obtaining manner in which "first high j bits are a value of the integral part and low k bits are a value of the fractional part".

It should be noted that, in some cases, a bit may be lost. For example, as shown in FIG. 3, if a bit is shifted to the right, data 1 at the end is lost. However, in this case, a final value is still obtained based on the foregoing principle, to be specific, the high j bits are used as the value of the integral part and the low k bits are used as the value of the fractional part.

Because a function implemented by the shift subcircuit is only shifting, implementation is very simple, and few resources are occupied.

Embodiment 5

Based on the foregoing embodiments, an output subcircuit 44 is specifically described in this embodiment.

The output subcircuit is configured to output a product of A and B based on signs of a and b and with reference to a shift result. It may be understood that, if the signs of a and b respectively correspond to signs of A and B, a sign of the product of A and B may be finally determined based on the signs of a and b. For example, when a sign of a is the same as a sign of A, and a sign of b is the same as a sign of B, the signs of A and B may be simply determined based on a multiplication operation rule (two positives make a positive, a positive and a negative make a negative, and two negatives make a positive) and the signs of a and b. For example, when one of the signs of a and b is positive and the other sign is negative, the final product of A and B is negative.

In this embodiment, the output subcircuit is configured to perform a sign operation. Implementation is very simple, and few resources are occupied.

Embodiment 6

Figure 5:
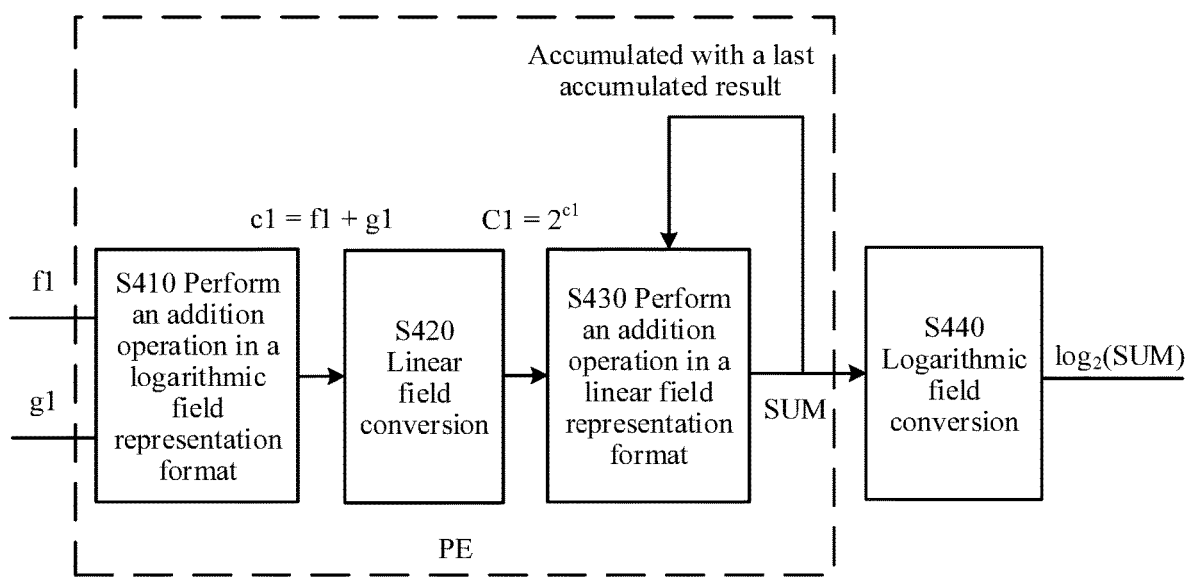
FIG. 5 is a schematic flowchart of a multiply-accumulate operation according to an embodiment of this application.

Based on the foregoing embodiments, a multiply-add operation is specifically described in this embodiment. FIG. 5 is a schematic flowchart of the multiply-add operation. As shown in FIG. 5, for example, to implement F1×G1+F2×G2+F3×G3 . . . , the multiply-add operation includes the following steps.

S410. Perform an addition operation in a logarithmic field representation format.

The data F1 and the data G1 are data in a linear representation format, and are respectively f1 and g1 in the logarithmic field representation format, where f1=$\log_2$(F1), and g1=$\log_2$(G1). The data f1 and the data g1 in the logarithmic field representation format are input, and c1 is obtained by adding f1 and g1, that is, c1=f1+g1. In this way, a multiplication operation F1×G1 in the linear representation format is converted into an addition operation f1+g1 in the logarithmic field representation format. It should be understood that the input data f1 and g1 in the logarithmic field representation format may be preprocessed using software (to be specific, completed using a general purpose processor such as a CPU) or hardware (for example, completed based on a hardware device such as a FPGA or an ASIC).

S420. Perform linear field conversion.

That c1 that equals to f1+g1 in the logarithmic field representation format is converted into a linear representation format C1, that is, $2^{c1}$ is calculated, where C1=$2^{c1}$=F1×G1. It should be understood that the linear field conversion is performed in each PE by a linear conversion circuit. In an existing floating-point data representation format, the linear conversion circuit may be based on a conventional floating-point exponentiation operation unit, in other words, $2^{c1}$ is calculated based on the floating-point exponentiation operation unit. Because the floating-point data representation format V is based on the foregoing described meanings, an operation amount of calculating $2^{c1}$ by the floating-point exponentiation operation unit is huge, and an operation speed is slow. In this application, a linear field conversion circuit may include the exponentiation operation subcircuit, the shift subcircuit, the output subcircuit, and the like in FIG. 4.

S430. Perform an addition operation in a linear representation format.

The linear representation format C1 obtained in S420 is added to an existing accumulated result. In this way, S410 and S420 are repeatedly performed to obtain Ci, where $Ci=2^{ci}=Fi \times Gi$, $ci=fi+gi$, a value of i is 1, 2, 3, . . . , and the like, and a maximum value of i is determined by a size of the multiply-add operation. The accumulated result SUM=C1+C2+C3+ . . . . In FIG. 5, S430 points to a loop of S430 on the right, indicating that Ci obtained this time and the last accumulated result are accumulated (certainly, Ci and data in another multiplier may alternatively be accumulated). After the accumulated result SUM is obtained, if SUM needs to be further used as a multiplier to continue to perform the multiplication operation in a next step, S440 is performed. If the operation for SUM is no longer required in the next step, SUM may be output directly to the DDR memory 220 for storage using an output buffer.

S440. Perform logarithmic field conversion.

After the accumulated result SUM is obtained, if SUM needs to be further used as a multiplier to continue to perform the multiplication operation in the next step, SUM is converted into the logarithmic field representation format, that is, $\log_2(SUM)$ is calculated, and returned to the data buffer as input data such that S410 is performed again. It should be understood that the logarithmic field conversion is performed outside the PE by a logarithmic conversion circuit.

A specific example is used below to describe a multiply-add operation process in an embodiment of this application.

Data F and data G are input.

In a logarithmic field representation format 1.3.2, f=001010, representing binary data F, (+) $2^{\wedge}(0.10)$ <<(2-0)=101.10101.

In the logarithmic field representation format 1.3.2, g=101110, representing binary data G, (−) $2^{\wedge}(0.10)$ <<(3-0)=−1011.0101.

For example, C1=F×G, C2=F×G, and SUM=C1+C2 that are need to be calculated in a multiply-add operation, and then SUM is represented as sum (that is, $\log_2(SUM)$ is calculated) in a logarithmic field representation format 1.4.4 for subsequent multiplication. C1 in the logarithmic field representation format 1.4.4 is represented as c1, C2 in the logarithmic field representation format 1.4.4 is represented as c2, and BASE=3.

(1) First calculate f+g=−(01010+β1110)=−(11000)=111000, that is, calculate logarithmic multiplication.

(2) Linear field conversion C1=C2=(−)$2^{\wedge}(0.00)$<<(6−3)=(−)1000.0000, represented as C1=C2=10001000.00000000 in a 1.7.8 format.

(3) Calculate SUM=C1+C2=10010000.00000000 (a decimal number is −16).

(4) Represent SUM as sum in the logarithmic field representation format 1.4.4. Find a bit h in which a highest bit 1 of an absolute value of SUM is located, where h=12, and subtract a quantity of bits k of a fractional part in the linear representation format, where k=8, to obtain a value indicated by an integral place in the logarithmic field representation format, that is, 12−8=4(0100). Because BASE=−3, and M'=M−BASE=4−(−3)=7, the value indicated by the integral place in the logarithmic field representation format is represented as 0111. Denote consecutive s bits (for example, 8 bits) after the highest bit 1 as S, calculate log(1.S) through table lookup, and perform table lookup on $\log_2(1.00000000)$, to obtain a decimal place 0000 in the logarithmic field representation format. Splice the decimal place and the integral place in the logarithmic field representation format, and set a sign bit to be consistent with an original sign bit, to obtain sum 101110000 in the logarithmic field representation format 1.4.4.

Embodiment 7

Figure 9:
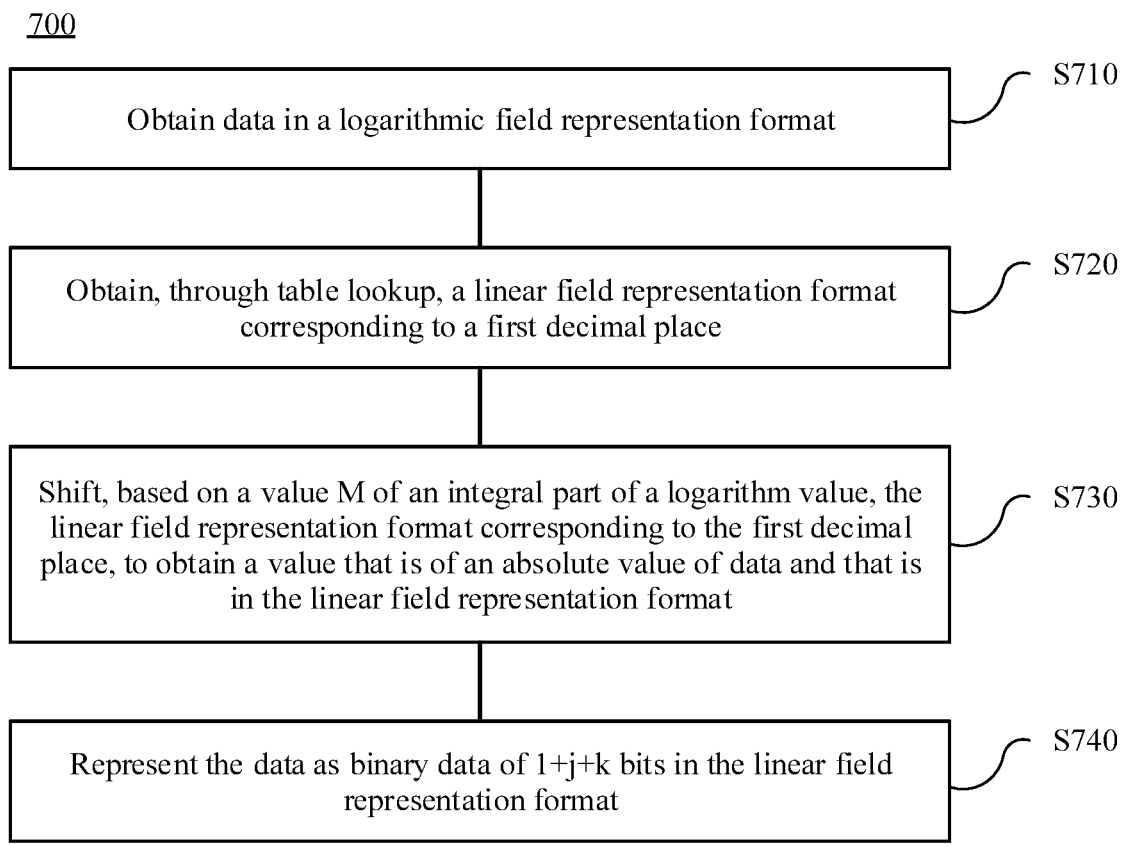
FIG. 9 is a schematic flowchart of a data format conversion method according to an embodiment of this application.

Based on the foregoing embodiments, a data format conversion method 700, in other words, a linear field conversion procedure shown in S420 in FIG. 5, is described below in detail in an embodiment of this application. FIG. 9 is a schematic flowchart of the data format conversion method 700 according to an embodiment of this application. The method 700 may be performed by a linear conversion circuit 800. FIG. 10 is a schematic diagram of performing linear field conversion by the linear conversion circuit 800 according to an embodiment of this application. As shown in FIG. 10, the linear conversion circuit 800 may include an obtaining subcircuit 810, a decoding subcircuit 820, a shift subcircuit 830, and an output subcircuit 840. Each subcircuit may be implemented based on an FPGA or an ASIC. The subcircuits 810 to 840 are respectively used to perform steps S710 to S740 of the method 700.

The data format conversion method 700 in this embodiment includes the following steps.

S710. The obtaining subcircuit 810 obtains data in a logarithmic field representation format 1.m.n. 1 bit is a first sign bit, m bits are a first integral place, and n bits are a first decimal place. The data herein may include image data and/or a training parameter. Specifically, a linear conversion circuit in a PE may obtain the image data in the logarithmic field representation format from a data buffer, and/or obtain the training parameter in the logarithmic field representation format from a parameter buffer.

For example, the obtaining subcircuit 810 obtains data 101010 in a logarithmic field representation format 1.3.2, where a first sign bit is 1, in other words, a data sign is negative, a first integral place is 010, and a first decimal place is 01.

S720. The decoding subcircuit 820 obtains, through table lookup, a linear representation format corresponding to a first decimal place. Specifically, the decoding subcircuit 820 obtains the first decimal place with n bits from the obtaining subcircuit 810, and performs a decoding operation. A result of $2^N$ is directly obtained in the decoding operation using hardware combination logic, in other words, the result of $2^N$ is directly obtained through the table lookup. It should be understood that, because a quantity of values of the first decimal place with n bits is limited, the linear representation format corresponding to the first decimal place (under a specific precision requirement) may be enumerated. The logarithmic field representation format 1.3.2 is still used as an example for description. 20.00 corresponds to binary 1.0000000, $2^{0.01}$ corresponds to binary 1.0011000, $2^{0.10}$ corresponds to binary 1.0110101, and $2^{0.11}$ corresponds to binary 1.1010111. Herein N is represented in binary, and the correspondences are stored in a table through pre-calculation.

The decoding subcircuit 820 obtains, through the table lookup, 1.0110101 in the linear representation format corresponding to a first decimal place 10. In a specific example, the decoding subcircuit 820 may be a device with two-significant-bit input and eight-significant-bit output shown in FIG. 10, and stores a table of a correspondence between the two-significant-bit input and the eight-significant-bit output. It should be understood that the eight-significant-bit output is a case in this example, and a bit may be added or reduced based on an actual requirement.

It should be understood that, when n=2, for the first decimal place, there are four groups of different cases (00, 01, 10, and 11) in total. The result of $2^N$ is calculated in advance, and the result is rounded to 8 bits, and recorded and stored in a table as shown in FIG. 10 and the following:

00—10000000 (representing a value 1. 0000000 in the linear representation format),
01—10011000 (representing a value 1. 0011000 in the linear representation format),
10—10110101 (representing a value 1. 0110101 in the linear representation format), and
11—11010111 (representing a value 1. 1010111 in the linear representation format).

S730. The shift subcircuit 830 shifts, based on a value M of an integral part of a logarithm value, the linear representation format corresponding to the first decimal place, to obtain a value that is of an absolute value of data and that is in the linear representation format. Specifically, the shift subcircuit 830 obtains the first integral place of m bits from the obtaining subcircuit 810, obtains the result of $2^N$ from the decoding subcircuit 820, and performs a shift operation on the decoding result of the decoding subcircuit 820. A value of the first integral place of m bits is M', a value indicated by the first integral place of m bits is M, M is a value of an integral part of a logarithm to base 2 of an absolute value of data, and M=M'+BASE. If real data is wanted, the decoding result of the decoding subcircuit 820 should be shifted based on M. It should be understood that, because the logarithmic field representation format 1.m.n is applied to a computing engine or a convolution computing chip, the shift subcircuit 830 may be preset to obtain the first integral place of m bits from the obtaining subcircuit 810, or a user interface is set to facilitate a user to set a value of m and/or a value of n.

As described above, when M is used for an operation, if M is a positive number, it indicates shifting to the left by M bits, or if M is a negative number, it indicates shifting to the right by bits of an absolute value of M. To be specific, shifting, based on the value M of the integral part of the logarithm value, the linear representation format corresponding to the first decimal place, to obtain the value that is of the absolute value of the data and that is in the linear representation format in step S730 may include, when M is greater than 0, shifting the linear representation format corresponding to the first decimal place to the left by M bits, to obtain the value that is of the absolute value of the data and that is in the linear representation format, and when M is less than 0, shifting the linear representation format corresponding to the first decimal place to the right by bits of the absolute value of M, to obtain the value that is of the absolute value of the data and that is in the linear representation format.

Certainly, in this embodiment of this application, M' may be used instead of M in the operation. If M' is a non-negative value, only left shifting can be performed.

The shift subcircuit 830 shifts, based on the value 010 indicated by the first decimal place, 1.0110101 in the linear representation format corresponding to the first decimal place 10 to the left by two bits, to obtain 101.10101.

S740. The output subcircuit 840 represents the data as binary data of 1+j+k bits in the linear representation format. Specifically, the output subcircuit 840 obtains the first sign bit of 1 bit from the obtaining subcircuit 810, and assigns a value of the first sign bit to the second sign bit. In other words, the output subcircuit 840 sets the second sign bit based on the first sign bit. For example, if the data is a positive number, the second sign bit is set to 0, or if the data is a negative number, the second sign bit is set to 1. This is not limited in this embodiment of this application. The output subcircuit 840 obtains a shifted result from the shift subcircuit 830, and fills zero or deletes an insignificant bit for the shifted result in order to make the result meet a 1.j.k format. Optionally, the output subcircuit 840 may convert the obtained result in the 1.j.k format into a result in complement representation, to obtain the final result. This is not limited in this embodiment of this application.

The output subcircuit 840 fills zero and determines the second sign bit based on the first sign bit, and represents the data as binary data of 1+j+k bits in the linear representation format, for example, represents the data as 1000010110101000 in a linear representation format 1.7.8.

According to the data format conversion method in this embodiment of this application, the data in the logarithmic field representation format is obtained, and data represented in the linear representation format is obtained by performing simple table lookup and shifting on the data in the logarithmic field representation format in this embodiment of this application. A complex power operation does not need to be performed, and this can reduce overheads during data conversion between a logarithmic field and a linear field, and improve a speed of convolution calculation.

In the example in FIG. 10, the obtaining subcircuit 810 obtains the data 101010 in the logarithmic field representation format 1.3.2, where the first sign bit is 1, in other words, the data sign is negative, the first integral place is 010, and the first decimal place is 01.

The decoding subcircuit 820 obtains, through the table lookup, 1.0110101 in the linear representation format corresponding to the first decimal place 10. In a specific example, the decoding subcircuit 820 may be a device with two-significant-bit input and eight-significant-bit output shown in FIG. 10, and stores a table of a correspondence between the two-significant-bit input and the eight-significant-bit output. It should be understood that the eight-significant-bit output is a case in this example, and a bit may be added or reduced based on an actual requirement.

It should be understood that, when n=2, for the first decimal place, there are four groups of different cases (00, 01, 10, and 11) in total. A result of $2^N$ is calculated in advance, and the result is rounded to 8 bits, and recorded and stored in a table as shown in FIG. 10 and the following:

00—10000000 (representing a value 1. 0000000 in the linear representation format),
01—10011000 (representing a value 1. 0011000 in the linear representation format),
10—10110101 (representing a value 1. 0110101 in the linear representation format), and
11—11010111 (representing a value 1. 1010111 in the linear representation format).

The shift subcircuit 830 shifts, based on the value 010 indicated by the first decimal place, 1.0110101 in the linear representation format corresponding to the first decimal place 10 to the left by two bits, to obtain 101.10101.

The output subcircuit 840 fills zero and determines the second sign bit based on the first sign bit, and represents the data as binary data of 1+j+k bits in the linear representation format, for example, represents the data as 1000010110101000 in a linear representation format 1.7.8.

Figure 11:
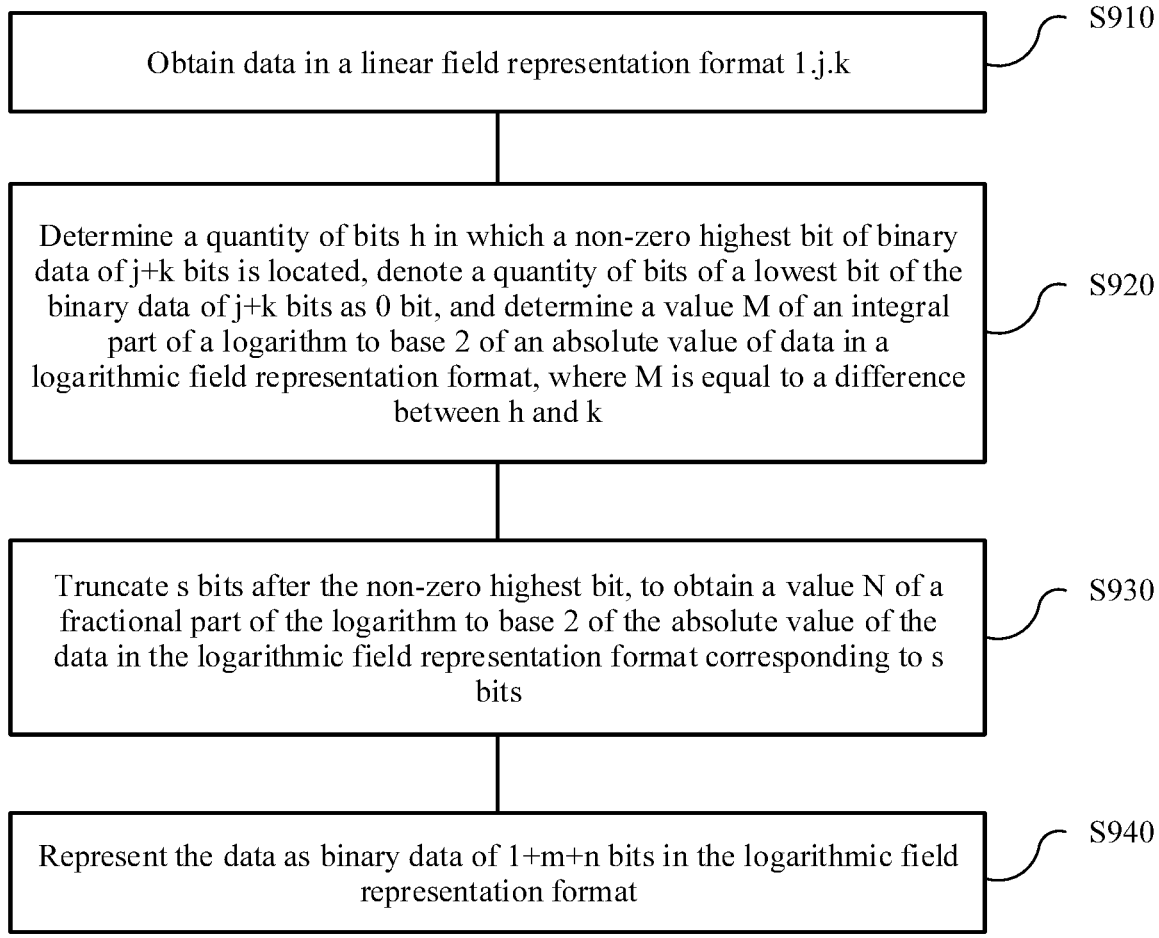
FIG. 11 is a schematic flowchart of a data format conversion method according to an embodiment of this application.
Figure 12:
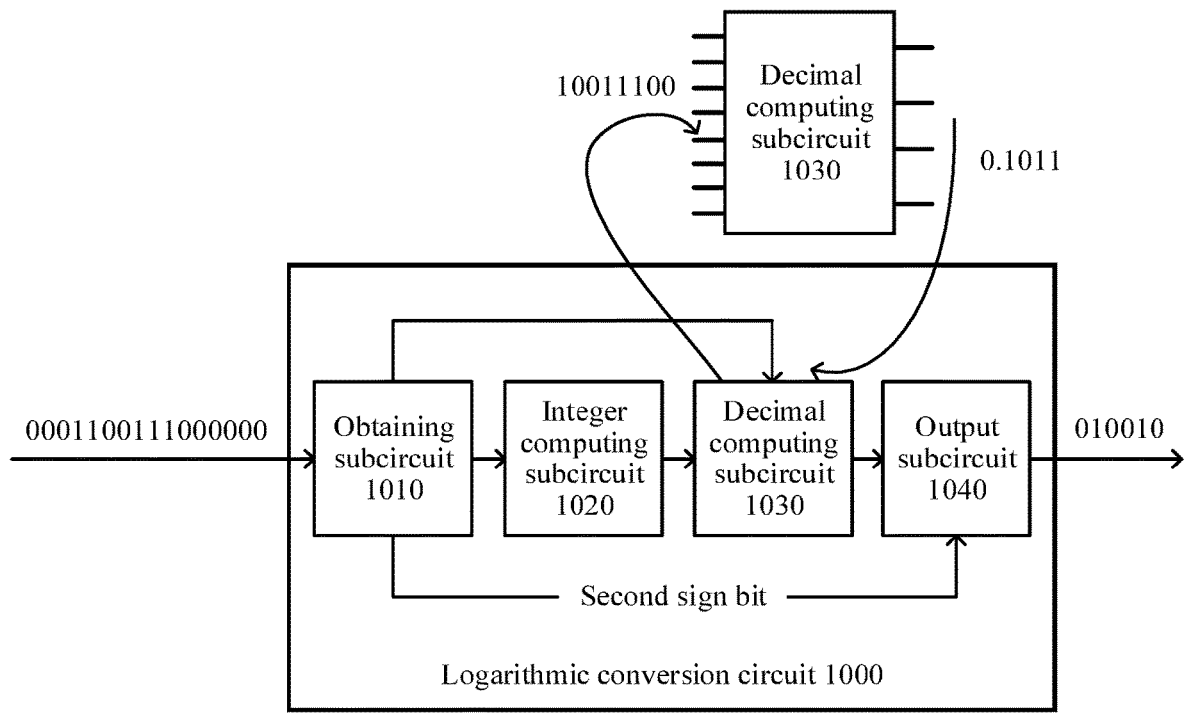
FIG. 12 is a schematic diagram of performing logarithmic field conversion by a logarithmic conversion circuit according to an embodiment of this application.

A data format conversion method 900, in other words, a logarithmic field conversion procedure, is described below in detail in an embodiment of this application. FIG. 11 is a schematic flowchart of the data format conversion method 900 according to an embodiment of this application. The method 900 may be performed by a logarithmic conversion circuit 100. FIG. 12 is a schematic diagram of performing logarithmic field conversion by a logarithmic conversion circuit 1000 according to an embodiment of this application. As shown in FIG. 12, the logarithmic conversion circuit 1000 may include an obtaining subcircuit 1010, an integer computing subcircuit 1020, a decimal computing subcircuit 1030, and an output subcircuit 1040. Each subcircuit may be implemented based on an FPGA or an ASIC. The subcircuits 1010 to 1040 are respectively used to perform steps S910 to S940 of the method 900.

Embodiment 8

Based on the foregoing embodiments, logarithmic field conversion is specifically described in this embodiment. As described in the foregoing embodiment (for example, in Embodiment 2), the logarithmic field conversion is mainly calculating a logarithm to base 2 of an absolute value of a linear field number (or with reference to BASE), and a result is represented with reference to a sign bit. The conversion method may be implemented using software (to be specific, a converted value is output using a CPU operation software program). To accelerate a processing speed, the conversion method may alternatively be implemented based on a specific hardware circuit (such as an ASIC or an FPGA). In this embodiment, implementation based on the hardware circuit is specifically described.

In this embodiment, the logarithmic field conversion is completed by a logarithmic field conversion circuit. The logarithmic field conversion circuit includes an obtaining subcircuit, an integer computing subcircuit, a decimal computing subcircuit, and an output subcircuit. Referring to FIG. 11 and FIG. 12, a processing procedure of the subcircuits is as follows.

S910. An obtaining subcircuit 1010 obtains data in a linear representation format 1.j.k, where 1 bit is used to represent a second sign bit, j bits are used to represent a second integral place, and k bits are used to represent a second decimal place. The data herein may be data that is output from an output buffer and that is obtained after an accumulated operation, or may be data obtained in another manner. This is not limited in this embodiment of this application.

For example, as shown in FIG. 12, the obtaining subcircuit 1010 obtains data 0 0011001 11000000 (denoted as 25.75 in decimal notation) in a linear representation format 1.7.8, where a data sign is positive, a second integral place is 0011001, and a second decimal place is 11000000.

S920. An integer computing subcircuit 1020 determines that a location in which a non-zero highest bit of binary data of j+k bits is located is an $h^{th}$ bit (a quantity of bits of a lowest bit of the binary data of j+k bits is denoted as a $0^{th}$ bit), and determines a value M of an integral part of a logarithm to base 2 of an absolute value of data in a logarithmic field representation format, where M is equal to a difference between h and k.

For example, the data 0001100111000000 in the linear representation format 1.7.8 is still used as an example. For 0001100111000000, the integer computing subcircuit 1020 first finds a location of a highest bit 1, and starts encoding from 0 from the right to the left. The highest bit 1 is at an $h^{th}$ bit, and h=12. Therefore, the value M of the integral part the logarithm to base 2 of the absolute value of the data equals to h−k, that is, 12−8=4 (denoted as 0100 in binary).

To avoid a negative value of m bits in the 1.m.n format, BASE may be set, and a first integral place of m bits may be obtained through M'=M−BASE.

S930. A decimal computing subcircuit 1030 truncates, from a high bit to a low bit, s bits after the non-zero highest bit, to obtain an absolute value of data in the logarithmic field representation format corresponding to s bits, and calculates the logarithm to base 2 of the absolute value, to obtain a value N of a fractional part.

For example, the data 0001100111000000 in the linear representation format 1.7.8 is still used as an example. The decimal computing subcircuit 1030 truncates s bits (for example, 8 bits) after the non-zero highest bit to obtain 10011100, and calculates $\log_2(1.10011100)$ to learn that the value N of the fractional part of a logarithm to base 2 of an absolute value of data in a corresponding logarithmic field representation format is 0.11. The value N of the fractional part of the logarithm to base 2 of the absolute value of the data is represented as 0.1011 in binary.

A quantity of bits (for example, 8 bits or 16 bits) representing a number is limited, and a value of s bits may be only limited. Therefore, under a specific precision requirement, the logarithmic field representation format corresponding to s bits may be exhaustive. That the decimal computing subcircuit 1030 truncates s bits after the non-zero highest bit is obtaining a value y of s bits after the non-zero highest bit of the data in the linear representation format 1.j.k based on the obtaining subcircuit 1010. Then the decimal computing subcircuit 1030 calculates $\log_2(1.y)$ to obtain the value N of the fractional part of the logarithm to base 2 of the absolute value of the data. There may be a plurality of manners of obtaining N, and an example is used below for description. In specific implementation, a value of s may be determined based on a precision requirement. Optionally, s is greater than n.

In a specific example, the decimal computing subcircuit 1030 may be a device with eight-significant-bit input and five-significant-bit output shown in FIG. 12. It should be understood that the five-significant-bit output is a case in this example, and a bit may be added or reduced based on an actual requirement.

S940. An output subcircuit 1040 represents the data as binary data of 1+m+n bits in the logarithmic field representation format.

Specifically, the output subcircuit 1040 obtains the second sign bit of 1 bit from the obtaining subcircuit 1010, and assigns a value of the second sign bit to the first sign bit, in other words, sets the first sign bit in the logarithmic field representation format based on the second sign bit. For example, if the data is a positive number, the first sign bit is set to 0, or if the data is a negative number, the first sign bit is set to 1. This is not limited in this embodiment of this application. In addition, the output subcircuit 1040 adds the integral part that is of the logarithm to base 2 of the absolute value of the data and that is obtained by the integer computing subcircuit 1020, and the fractional part that is of the logarithm to base 2 of the absolute value of the data and that is obtained by the decimal computing subcircuit 1030, to separately obtain the first integral place and the first decimal place, and fills zero or deletes an insignificant bit in order to make the result meet the 1.m.n format. Optionally, the output subcircuit 1040 may convert the obtained result in the 1.m.n format into a result in complement representation. This is not limited in this embodiment of this application.

The output subcircuit 1040 adds the value M of the integral part of the logarithm to base 2 of the absolute value of the data and the value N of the fractional part of the logarithm to base 2 of the absolute value of the data, and fills zero or deletes an insignificant bit for the added result. The first sign bit is determined based on the second sign bit, and data is represented as binary data of 1+m+n bits in the logarithmic field representation format, for example, represented as 010010 in a logarithmic field representation format 1.3.4 (the first sign bit is 0, the first integral place is three significant bits 100, and the first decimal place is four significant bits 1011).

According to the data format conversion method in this embodiment of this application, the data in the linear representation format is obtained, and the data represented in the logarithmic field representation format is obtained through simple truncation and comparison. A complex logarithmic operation does not need to be performed, and this can reduce overheads during data conversion between a linear field and a logarithmic field, and improve a speed of convolution calculation.

Embodiment 9

Based on the foregoing embodiments, the step S930 in Embodiment 8 is described in detail in this embodiment. Specifically, the step may be implemented using at least the following three methods.

(1) Method 1

Optionally, in an embodiment, the obtaining, in step S930, a value N of a fractional part of a result obtained by calculating a logarithm to base 2 of an absolute value of data in a logarithmic field representation format corresponding to s bits may include obtaining, through table lookup, the value N of the fractional part of the logarithm to base 2 of the absolute value of the data in the logarithmic field representation format corresponding to s bits, where the table stores N corresponding to all possible values of s bits. A method for determining the value N of the fractional part of the logarithm to base 2 of the absolute value of the data is referred to as a table lookup method.

Specifically, the example in FIG. 12 is still used for description. A decimal computing subcircuit 1030 truncates 8 bits after a non-zero highest bit to obtain 10011100, and obtains a result of $\log_2(1.10011100)$ through table lookup. The decimal computing subcircuit 1030 stores a table of a correspondence between eight-significant-bit input and five-significant-bit output. A result of $\log_2(1.y)$ is recorded in the table. 4 bits after a decimal place is reserved for the result.

$\log_2(1.00000000)=0.0000$, and a corresponding output result is 0.0000, $\log_2(1.00000001)=0.0000$, and a corresponding output result is 0.0000, . . . , and $\log_2(1.11111111)=1.0000$, and a corresponding output result is 1.0000 (the value is 1.0000 after rounding).

An integral place 1 in 1.y is fixed, and an integral place 0 of an output result is also fixed. Therefore, an 8-bit input and 4-bit output table may be stored. In this example, the result of $\log_2(1.10011100)$ through table lookup is that the value N of the fractional part of the logarithm to base 2 of the absolute value of the data is represented as 0.1011.

(2) Method 2

Optionally, in another embodiment, the obtaining, in step S930, a value N of a fractional part of a logarithm to base 2 of an absolute value of data in a logarithmic field representation format corresponding to s bits may include comparing a value corresponding to s bits with preset $2^n$ comparison values, where an $i^{th}$ comparison value is less than an $(i+1)^{th}$ comparison value, and the $i^{th}$ comparison value corresponds to one value $N_i$, and when the value corresponding to s bits is greater than or equal to a $T^{th}$ comparison value, and is less than a $(T+1)^{th}$ comparison value, determining that the value N of the fractional part of the logarithm to base 2 of the absolute value of the data in the logarithmic field representation format corresponding to s bits is $N_T$. A method for determining the value N of the fractional part of the logarithm to base 2 of the absolute value of the data is referred to as a level-by-level comparison method.

Figure 13:
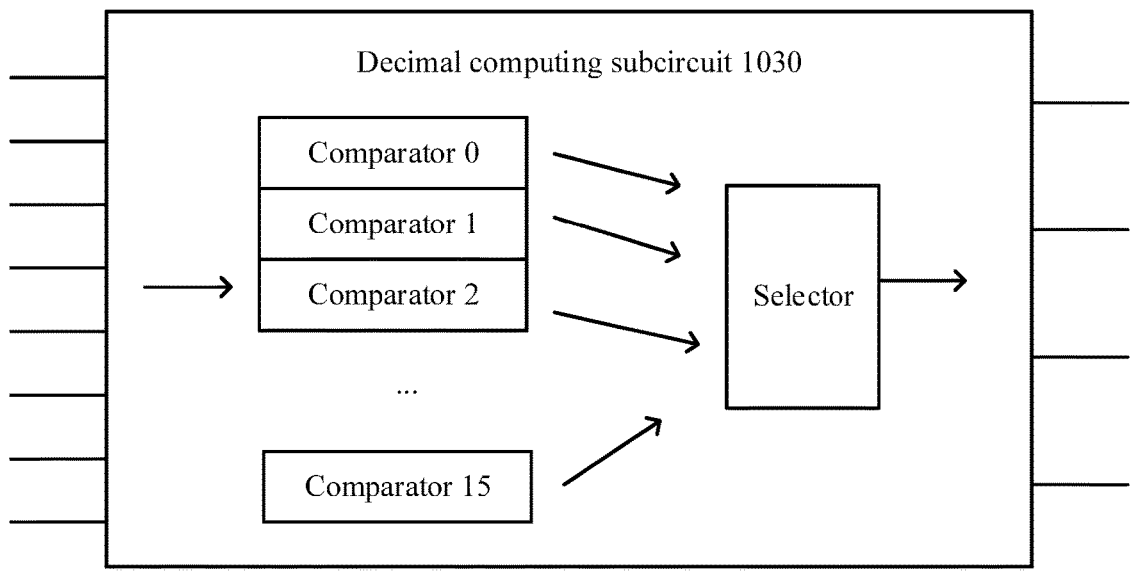
FIG. 13 is a schematic diagram of a manner of determining a value of a fractional part by a decimal computing subcircuit.

Specifically, the example in FIG. 12 is still used for description. The decimal computing subcircuit 1030 truncates 8 bits after the non-zero highest bit to obtain 10011100, and obtains, through comparison of a comparator group, the value N of the fractional part of the logarithm to base 2 of the absolute value of the data. FIG. 13 is a schematic diagram of determining a value N of a fractional part by a decimal computing subcircuit 1030. A comparator group may include $2^n$ comparators, where $2^n=16$, for example, a comparator 0, a comparator 1, . . . , and a comparator 15. A comparison value is preset in each comparator. The preset comparison values are arranged in ascending order, in other words, a comparison value 0<the comparator 1< . . . <the comparator 15. The comparison values are alternatively set based on the following table.

$\log_2(1.00000000)=0.0000$, and a corresponding output result is 0.0000, $\log_2(1.00000001)=0.0000$, and a corresponding output result is 0.0000, . . . , and $\log_2(1.11111111)=1.0000$, and a corresponding output result is 1.0000.

A table lookup value with a jump in the output results of 4 bits, namely, an antilogarithm in $\log_2(\ )$, is set to a comparison value. For example, the comparison value 0 is set to 1.00000000. Optionally, the comparison value 0 is directly set to 00000000. In other words, output results corresponding to values between any two adjacent comparison values are consistent. Therefore, based on a result of the level-by-level comparison, the value N of the fractional part of the logarithm to base 2 of the absolute value of the data may be directly obtained using a selector. For the input 8 bits (10011100), an output result of the selector is 0.1011.

For the comparison value 0 greater than or equal to the comparator 0 and a comparison value 1 less than the comparator 1, a result of the selector is 0.0000, for the comparison value 1 greater than or equal to the comparator 1 and a comparison value 2 less than the comparator 2, a result of the selector is 0.0001, . . . for a comparison value 14 greater than or equal to a comparator 14 and a comparison value 15 less than the comparator 15, a result of the selector is 0.1111, and for the comparison value 15 greater than or equal to the comparator 15, a result of the selector is 1.0000.

(3) Method 3

Optionally, in still another embodiment, the obtaining, in step S930, a value N of a fractional part of a logarithm to base 2 of an absolute value of data in a logarithmic field representation format corresponding to s bits may include comparing a value corresponding high x bits of s bits with $2^n$ comparison values, where x is greater than 0 and less than s, an $i^{th}$ comparison value is less than an $(i+1)^{th}$ comparison value, and the $i^{th}$ comparison value corresponds to a pair of values A and B, and calculating a result of x×A+B, and obtaining, based on the result of x×A+B, the value N of the fractional part of the logarithm to base 2 of the absolute value of the data.

Specifically, when x×A+B is calculated, a result obtained by multiplying the high x bits by A may be shifted to the right by k bits, a result obtained by shifting to the right by k bits is added to B, and then an added result is shifted to the left by k-n bits. The obtained high n bits are the value N of the fractional part of the logarithm to base 2 of the absolute value of the data in the logarithmic field representation format corresponding to s bits.

Figure 14:
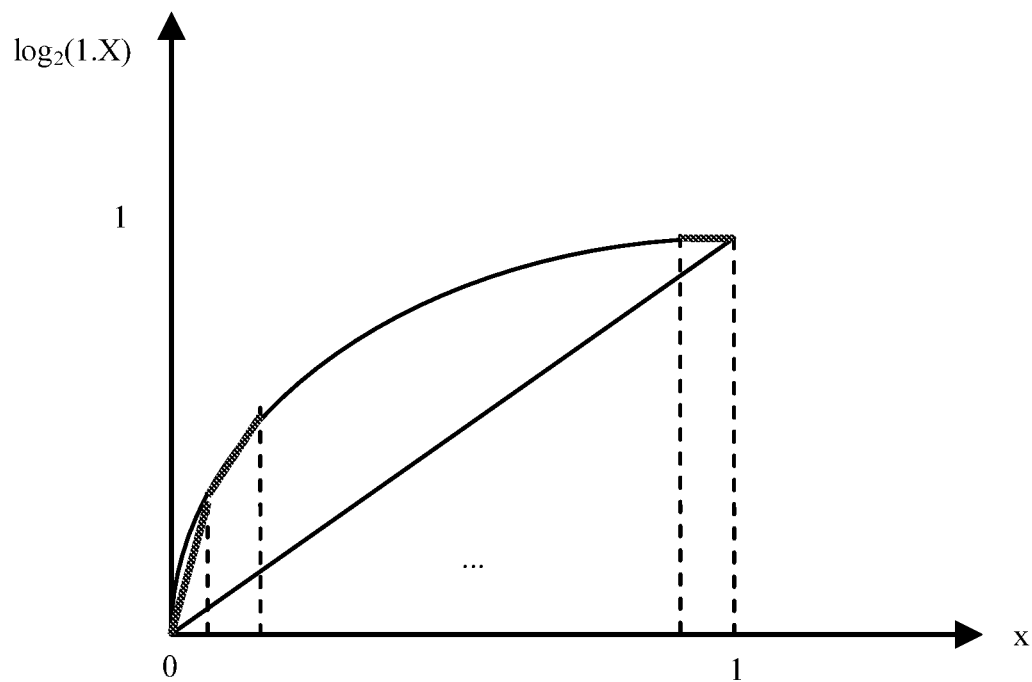
FIG. 14 is a schematic diagram of segment and fitting according to an embodiment of this application.
Figure 15:
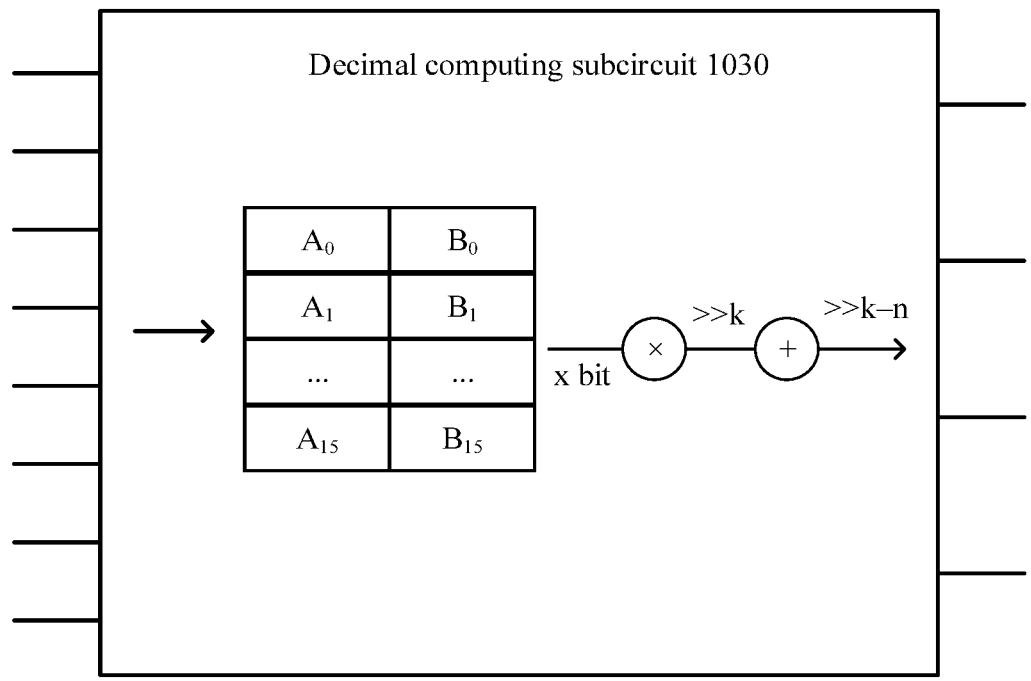
FIG. 15 is a schematic diagram of another manner of determining a value of a fractional part by a decimal computing subcircuit.

The example in FIG. 12 is still used for description. The decimal computing subcircuit 1030 truncates 8 bits after the non-zero highest bit to obtain 10011100, and a value of 10011100 is S. The table is looked up first, and then a segment and fitting result is calculated, to obtain the value N of the fractional part of the logarithm to base 2 of the absolute value of the data. FIG. 14 is a schematic diagram of segment and fitting according to an embodiment of this application. FIG. 15 is a schematic diagram of determining a value N of a fractional part by a decimal computing subcircuit 1030 according to an embodiment of this application. As shown in FIG. 14, a range of values of a first decimal place represented by 8 bits is [0,1), the range [0,1) is divided into $2^n$ segments in advance, where $2^n=16$. The 16 segments respectively correspond to 16 line segments on a curve of log(1.x), a linear expression that is $y=A_i x+B_i$ may be calculated for each line segment, and the linear expression is recorded in a table shown in FIG. 15, to be specific, $A_i$ and $B_i$ are recorded, where i=0, 1, . . . , and 15 such that 16 groups of $A_i$ and $B_i$ are obtained and recorded in the table. 8 bits after a highest bit is 10011100, the high x bits are taken, where x=4, and A and B are obtained through table lookup. A×S is calculated, and an obtained result is shifted to the right by k bits, where k=8 (>>8). B is added to a result obtained after the shift, and then an obtained result is shifted to the right by k−n bits, where k−n=4 (>>4), to obtain remaining 4 bits that are a first decimal place 1011. To be specific, the value N of the fractional part of the logarithm to base 2 of the absolute value of the data is 0.1011.

Embodiment 10

Figure 16:
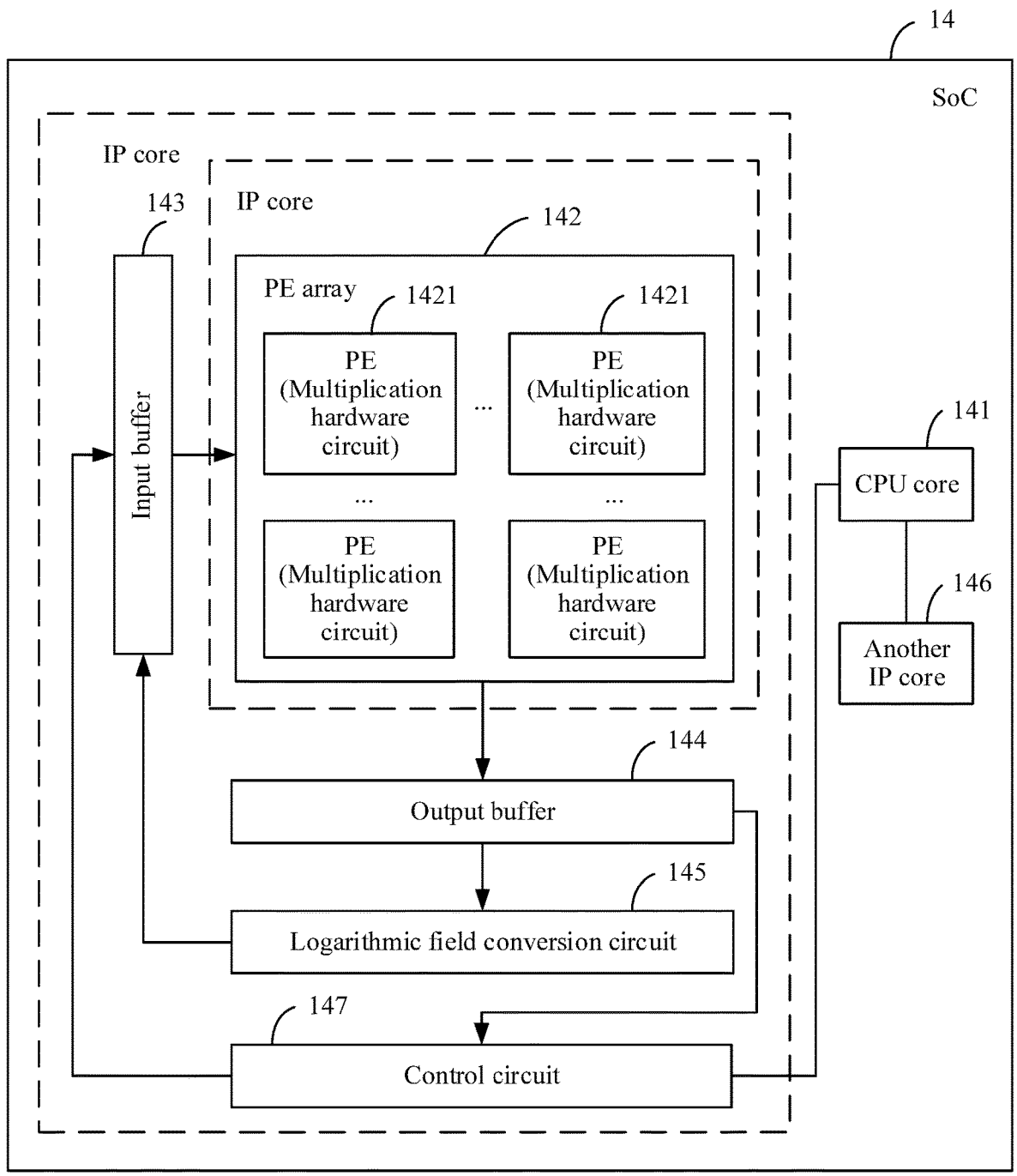
FIG. 16 is a schematic structural diagram of an SoC according to this application.

Based on the foregoing embodiments, this embodiment discloses a system-on-a-chip SoC (System on Chip) 14. Referring to FIG. 16, the SoC 14 includes a processor core 141 (namely, a CPU core) and a PE array 142 including one or more PE 1421, and each PE may include the multiplication hardware circuit 1421 described in the foregoing embodiments. The SoC further includes an input buffer 143, an output buffer 144, a logarithmic field conversion circuit 145, and a control circuit 147. Components other than the CPU core may be collectively referred to as a computing engine or a data acceleration engine, and a main function of these components is to process some specific calculation for the CPU core. The components on the SoC are separately described below.

The CPU core is mainly configured to execute some general-purpose software programs, for example, run an operating system, various application programs based on the operating system, and the like by reading an instruction. When the CPU core needs to perform some specific data processing (for example, processing a large quantity of image data), and if the computing engine is more suitable to process the data, the CPU core may send the data to the computing engine for processing.

The input buffer 143 is configured to store input data. The input data may be from the CPU core 141, or may be from the logarithmic field conversion circuit 145. A type of the input data is not limited, and the type of the data may be determined based on various applications. For example, for a neural network system, data and a parameter that need to be calculated may be included. Specifically, the data and the parameter may be separately stored using a plurality of memories.

The output buffer 144 is configured to store a result output by the PE array. If the result needs to be used again, the result may be converted by the logarithmic field conversion circuit 145 and output to the input buffer 143 for use in next calculation.

The input buffer and the output buffer may be implemented based on a storage medium such as an SRAM and an eDRAM.

The control circuit 147 is connected to the processor core 141 (namely, the CPU core), the input buffer 143, and the output buffer 144. After the control circuit interacts with the processor core (such as DMA protocol-based interaction or user-defined protocol and message interaction), the processor core obtains data in the output buffer.

In addition, the SoC in this application may further include another IP core 146, such as a GPU and a digital signal processor (DSP). This is not limited in this application.

Figure 17:
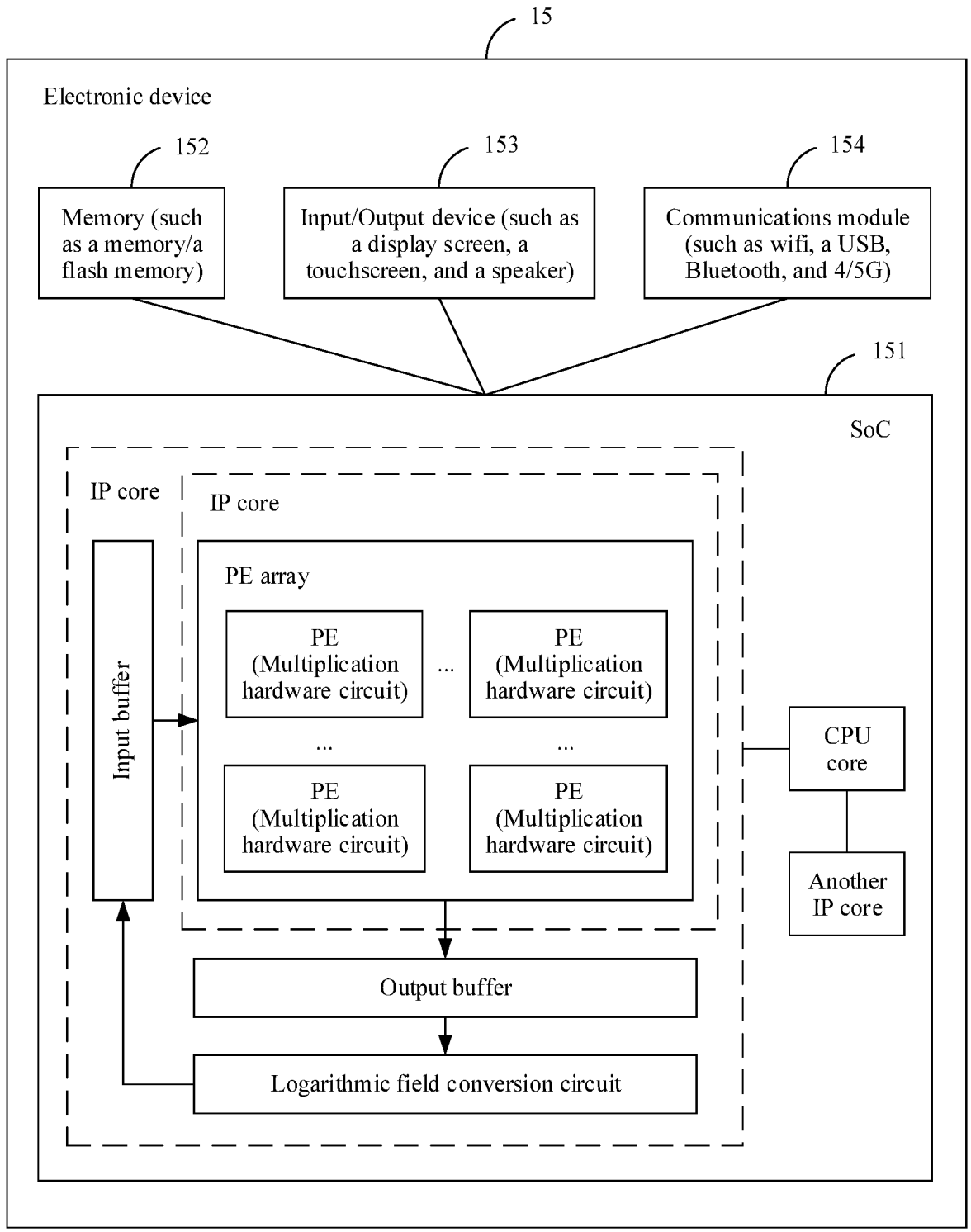
FIG. 17 is a schematic structural diagram of an electronic device according to this application.

Based on the foregoing embodiments, this embodiment provides an electronic device 15. FIG. 17 is a schematic structural diagram. The electronic device includes an SoC 151. The SoC may include a plurality of IP cores, for example, a CPU core, an IP core includes a PE array, or an IP core includes a PE array, an input buffer, an output buffer, and a logarithmic field conversion circuit. In addition, the SoC may further include another IP core 146. The SoC is usually closed into a separate chip, for example, a chip of Huawei HiSilicon Kirin series (such as Kirin 950 and Kirin 960) and an SoC chip of Qualcomm Snapdragon series (such as Snapdragon 650 and Snapdragon 660). In another implementation, each IP core may be separately encapsulated into one chip, or several IP cores are encapsulated into one chip together.

The electronic device 15 may further include another component, for example, may include a memory 152 (such as a memory or a flash memory), an input/output device 153 (such as a display screen, a touchscreen, a speaker, a mouse, and a keyboard), and various communications modules 154 (such as WI-FI, a universal serial bus (USB), BLUETOOTH, fourth generation (4G), and fifth generation (5G)). Implementation of these components is a technology well known to a person skilled in the art, and details are not described in this application.

It should be understood that each circuit or subcircuit in this embodiment of this application may be implemented based on an ASIC, an FPGA, another programmable logic device, a discrete gate or transistor logic device, a discrete hardware component, or the like. It should be noted that the ASIC, the FPGA, or the other programmable logic device, the discrete gate or the transistor logic device, and the discrete hardware component may be independent components, or may be integrated with a memory (a storage module).

It should be noted that the memory described in this specification is intended to include but not limited to these memories and any memory of another proper type.

All or some of the foregoing embodiments may be implemented using software, hardware, firmware, or any combination thereof. When software is used to implement the embodiments, all or some of the embodiments may be implemented in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD), a semiconductor medium (for example, a solid state disk (SSD)), or the like.

It should be understood that the first, the second, and various numbers in this specification are used for differentiation only for ease of description, instead of limiting the scope of this application.

It should be understood that the term "and/or" in this specification describes only an association relationship for describing associated objects and represents that three relationships may exist. For example, A and/or B may represent the following three cases. Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A multiplication circuit, configured to perform a multiplication operation on two pieces of data A and B, wherein the multiplication circuit comprises:
   an addition subcircuit configured to:
      obtain first logarithmic field data and second logarithmic field data that respectively correspond to A and B, wherein the first logarithmic field data comprises a first integral part and a first fractional part, and wherein the second logarithmic field data comprises a second integral part and a second fractional part; and
      perform an addition operation on the first logarithmic field data and the second logarithmic field data to obtain a third logarithmic field data, wherein the third logarithmic field data comprises a third integral part and a third fractional part;
   an exponentiation operation subcircuit coupled to the addition subcircuit and configured to perform an exponentiation operation in which a base is 2 and an exponent is the third fractional part to obtain an exponentiation operation result;
   a shift subcircuit coupled to the exponentiation operation subcircuit and configured to shift the exponentiation operation result to obtain a shift result based on the third integral part; and
   an output subcircuit coupled to the shift subcircuit and configured to output a product of A and B based on signs of the first logarithmic field data and the second logarithmic field data and with reference to the shift result.

2. The multiplication circuit of claim 1, wherein the addition subcircuit is further configured to calculate the first logarithmic field data and the second logarithmic field data based on logarithms to base 2 of absolute values of A and B and with reference to sign bits of the first logarithmic field data and the second logarithmic field data and comprise 1+m+n binary bits, wherein m and n are positive integers, wherein a first bit is a sign bit, wherein m bits are an integral part, and wherein n bits area a fractional part.

3. The multiplication circuit of claim 2, wherein the third integral part is a sum of the first integral part and the second integral part, and wherein the third fractional part is a sum of the first fractional part and the second fractional part.

4. The multiplication circuit of claim 2, wherein logarithmic field data is 0 when a value of a sign bit is 1, and both an integral part and a fractional part are 0.

5. The multiplication circuit of claim 1, wherein both A and B comprise 1+j+k binary bits, wherein both j and k are positive integers, wherein a first bit is a sign bit, wherein j bits are an integral part, and wherein k bits are a fractional part.

6. The multiplication circuit of claim 1, wherein the exponentiation operation result is a number greater than or equal to 1 and less than 2, wherein the exponentiation operation result comprises 1+w binary bits, wherein a first bit is an integral part, wherein w bits are a fractional part, wherein w is a positive integer greater than or equal to 1, wherein when the shift subcircuit is configured to shift the exponentiation operation result based on the third integral part, the shift subcircuit is specifically configured to shift the exponentiation operation result to the left by X bits, wherein X is equal to the third integral part minus (w−k), wherein the shift result is an absolute value of the product of A and B, wherein the absolute value of the product of A and B comprises a fourth integral part and a fourth fractional part, wherein the fourth integral part comprises j binary bits, wherein the fourth fractional part comprises k binary bits, and wherein when a quantity of bits for the left shift is less than 0, shifting to the left by X bits is equal to shifting to the right by bits of an absolute value of X.

7. The multiplication circuit of claim 1, wherein the exponentiation operation subcircuit is a decoding circuit, wherein the decoding circuit is configured to obtain the exponentiation operation result through decoding based on the third fractional part, or the exponentiation operation subcircuit is a table lookup circuit, and wherein the table lookup circuit is configured to obtain the exponentiation operation result through table lookup based on the third fractional part.

8. The multiplication circuit of claim 1, wherein the multiplication circuit further comprises an accumulator, and wherein the accumulator is configured to perform an accumulation operation on the product of A and B and another piece of data from the multiplication circuit or perform the accumulation operation on the product of A and B and the product from another multiplication circuit.

9. A system-on-a-chip, comprising:
a processor core;
a control circuit coupled to the processor core;
a data input buffer coupled to the control circuit and configured to obtain data from the processor core using the control circuit;
a data output buffer coupled to the control circuit; and
a multiplication hardware circuit array coupled to the data input buffer, comprising:
an addition subcircuit configured to:
obtain a first logarithmic field data and a second logarithmic field data that respectively correspond to A and B, wherein the first logarithmic field data comprises a first integral part and a first fractional part, and wherein the second logarithmic field data comprises a second integral part and a second fractional part; and
perform an addition operation on the first logarithmic field data and the second logarithmic field data to obtain a third logarithmic field data, wherein the third logarithmic field data comprises a third integral part and a third fractional part;
an exponentiation operation subcircuit coupled to the addition subcircuit and configured to perform an exponentiation operation in which a base is 2 and an exponent is the third fractional part to obtain an exponentiation operation result;
a shift subcircuit coupled to the exponentiation operation subcircuit and configured to shift the exponentiation operation result to obtain a shift result based on the third integral part; and
an output subcircuit coupled to the shift subcircuit and configured to output a product of A and B based on signs of the first logarithmic field data and the second logarithmic field data and with reference to the shift result,
wherein the multiplication hardware circuit array is configured to:
obtain data in the data input buffer for processing;
obtain a processed result;
output the processed result to the data output buffer; and
perform a multiplication operation on A and B, and
wherein the control circuit is further configured to interact with the processor core such that the processor core obtains data in the data output buffer.

10. The system-on-a-chip of claim 9, wherein the addition subcircuit is further configured to calculate the first logarithmic field data and the second logarithmic field data based on logarithms to base 2 of absolute values of A and B and with reference to sign bits of the first logarithmic field data and the second logarithmic field data, and comprise 1+m+n binary bits, wherein m and n are positive integers, wherein a first bit is a sign bit, wherein m bits are an integral part, and wherein n bits are a fractional part.

11. The system-on-a-chip of claim 10, wherein the third integral part is a sum of the first integral part and the second integral part, and wherein the third fractional part is a sum of the first fractional part and the second fractional part.

12. The system-on-a-chip of claim 10, wherein logarithmic field data is 0 when a value of a sign bit is 1 and both an integral part and a fractional part are 0.

13. The system-on-a-chip of claim 9, wherein both A and B comprise 1+j+k binary bits, wherein both j and k are positive integers, wherein a first bit is a sign bit, wherein j bits are an integral part, and wherein k bits are a fractional part.

14. The system-on-a-chip of claim 9, wherein the exponentiation operation result is a number greater than or equal to 1 and less than 2, wherein the exponentiation operation result comprises 1+w binary bits, wherein a first bit is an integral part, wherein w bits are a fractional part, wherein w is a positive integer greater than or equal to 1, wherein when the shift subcircuit is configured to shift the exponentiation operation result based on the third integral part, the shift subcircuit is specifically configured to shift the exponentiation operation result to the left by X bits, wherein X is equal to the third integral part minus (w−k), wherein the shift result is an absolute value of the product of A and B, wherein the absolute value of the product of A and B comprises a fourth integral part and a fourth fractional part, wherein the fourth integral part comprises j binary bits, wherein the fourth fractional part comprises k binary bits, and wherein when a quantity of bits for the left shift is less than 0, shifting to the left by X bits is equal to shifting to the right by bits of an absolute value of X.

15. The system-on-a-chip of claim 9, wherein the exponentiation operation subcircuit is a decoding circuit, wherein the decoding circuit is configured to obtain the exponentiation operation result through decoding based on the third fractional part; or the exponentiation operation subcircuit is a table lookup circuit, and wherein the table lookup circuit is configured to obtain the exponentiation operation result through table lookup based on the third fractional part.

16. The system-on-a-chip of claim 9, wherein the multiplication circuit further comprises an accumulator, wherein the accumulator is configured to perform an accumulation operation on the product of A and B and another piece of data from the multiplication circuit, or perform the accumulation operation on the product of A and B and the product from another multiplication circuit.

17. The system-on-a-chip of claim 9, further comprising a logarithmic field conversion circuit coupled to the multiplication hardware circuit array, and configured to:
perform logarithmic field conversion on output of the multiplication hardware circuit array; and
input a converted result to the data input buffer.

18. The system-on-a-chip of claim 17, wherein the logarithmic field conversion circuit comprises an integer computing subcircuit, a decimal computing subcircuit, and a second sign bit determining subcircuit, wherein the multiplication hardware circuit array is further configured to output linear field data, wherein the linear field data is a binary number consisting of 1+j+k bits, wherein both j and k are positive integers, wherein one of the bits is a second sign bit and indicates a positive or negative sign S, wherein j bits indicate a value J of an integral part of an absolute value of the linear field data, and k bits indicate a value K of a fractional part of the absolute value of the linear field data, wherein the integer computing subcircuit is configured to calculate a difference between hl and k based on a value hl of a quantity of bits in which a non-zero highest bit of the binary number of j+k bits of each of the linear field data is located, wherein the difference indicates a value of an integral part of a result from calculating a logarithm to base 2 of an absolute value of A1, and wherein a lowest bit of the binary number of j+k bits of each of the linear field data A1 is denoted as a $0^{th}$ bit, wherein the decimal computing subcircuit is configured to obtain a value of a fractional part of the result from calculating the logarithm to base 2 of the absolute value of each of the linear field data, and wherein the second sign bit determining subcircuit is configured to separately determine sign of the converted result in order to obtain the converted result based on a sign of each of the linear field data.

19. An electronic device, comprising:
a memory configured to store an instruction required for program running;
a system-on-a-chip coupled to the memory, wherein the system-on-a-chip comprises:
a processor core;
a control circuit coupled to the processor core;
a data input buffer coupled to the control circuit and configured to obtain data from the processor core using the control circuit;
a data output buffer coupled to the control circuit; and
a multiplication hardware circuit array coupled to the data input buffer, comprising:
an addition subcircuit configured to:
obtain a first logarithmic field data and a second logarithmic field data that respectively correspond to A and B, wherein the first logarithmic field data comprises a first integral part and a first fractional part, and wherein the second logarithmic field data comprises a second integral part and a second fractional part; and
perform an addition operation on the first logarithmic field data and the second logarithmic field data to obtain a third logarithmic field data, wherein the third logarithmic field data comprises a third integral part and a third fractional part;
an exponentiation operation subcircuit coupled to the addition subcircuit and configured to perform an exponentiation operation in which a base is 2 and an exponent is the third fractional part to obtain an exponentiation operation result;
a shift subcircuit coupled to the exponentiation operation subcircuit and configured to shift the exponentiation operation result to obtain a shift result based on the third integral part; and
an output subcircuit coupled to the shift subcircuit and configured to output a product of A and B based on signs of the first logarithmic field data and the second logarithmic field data and with reference to the shift result,
wherein the multiplication hardware circuit array is configured to:
obtain data in the data input buffer for processing;
obtain a processed result;
output the processed result to the data output buffer;
perform a multiplication operation on A and B; and
enable the processor core to obtain the processed result,
wherein the control circuit is further configured to interact with the processor core such that the processor core obtains data in the data output buffer.

20. The electronic device of claim 19, wherein the addition subcircuit is further configured to calculate the first logarithmic field data and the second logarithmic field data based on logarithms to base 2 of absolute values of A and B and with reference to sign bits of the first logarithmic field data and the second logarithmic field data, and comprise 1+m+n binary bits, wherein m and n are positive integers, wherein a first bit is a sign bit, wherein m bits are an integral part, and wherein n bits are a fractional part.

* * * * *